(12) United States Patent
Bechtel et al.

(10) Patent No.: US 8,070,329 B1
(45) Date of Patent: Dec. 6, 2011

(54) LIGHT EMITTING OPTICAL SYSTEMS AND ASSEMBLIES AND SYSTEMS INCORPORATING THE SAME

(75) Inventors: Jon H. Bechtel, Holland, MI (US); Harold C. Ockerse, Holland, MI (US); Darin D. Tuttle, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 1000 days.

(21) Appl. No.: 11/345,707

(22) Filed: Feb. 2, 2006

Related U.S. Application Data

(60) Provisional application No. 60/652,101, filed on Feb. 11, 2005, provisional application No. 60/707,075, filed on Aug. 10, 2005.

(51) Int. Cl.
*F21V 5/00* (2006.01)
(52) U.S. Cl. .................. 362/331; 362/335; 362/249.02
(58) Field of Classification Search .................. 362/326, 362/327, 329, 330, 331, 332, 334, 335, 520–522, 362/543, 545, 800, 244, 268, 311.01, 311.02, 362/475, 507, 509, 538, 540, 539; 257/676, 257/E33.056, E33.057, E33.058, E33.059, 257/98–100
See application file for complete search history.

(56) References Cited

U.S. PATENT DOCUMENTS

| | | | |
|---|---|---|---|
| 1,428,662 A * | 9/1922 | Ryan | ............................ 362/246 |
| 3,920,495 A | 11/1975 | Roberts | |
| 4,125,777 A | 11/1978 | O'Brien et al. | |
| 4,257,061 A | 3/1981 | Chapel, Jr. et al. | |
| 4,267,559 A | 5/1981 | Johnson et al. | |
| 4,394,600 A | 7/1983 | Flannagan | |
| 4,729,076 A | 3/1988 | Masami et al. | |
| 4,911,519 A | 3/1990 | Burton et al. | |
| 4,996,586 A | 2/1991 | Matsuda et al. | |
| 5,032,898 A | 7/1991 | Bowen et al. | |
| 5,060,027 A | 10/1991 | Hart et al. | |
| 5,113,232 A | 5/1992 | Itoh et al. | |
| 5,136,205 A | 8/1992 | Sokolich et al. | |
| 5,173,839 A | 12/1992 | Metz, Jr. | |
| 5,181,874 A | 1/1993 | Sokolich et al. | |
| 5,235,347 A | 8/1993 | Lee | |
| 5,291,039 A | 3/1994 | Ogata et al. | |
| 5,369,277 A | 11/1994 | Knodle et al. | |
| 5,384,471 A | 1/1995 | Schairer et al. | |
| 5,434,750 A | 7/1995 | Rostoker et al. | |
| 5,468,967 A | 11/1995 | Chan et al. | |
| 5,472,915 A | 12/1995 | Schairer et al. | |
| 5,629,232 A | 5/1997 | Jiang | |

(Continued)

FOREIGN PATENT DOCUMENTS

JP 06-314857 11/1994

OTHER PUBLICATIONS

Cree Research, Inc., Spec. Sheet, "G-Sic Technology Super Bright LEDs CXXX-CB290-E1000," revised May 1999, pp. 1-4.

(Continued)

*Primary Examiner* — Hargobind S Sawhney
(74) *Attorney, Agent, or Firm* — Price, Heneveld, Cooper, DeWitt & Litton, LLP; Scott P. Ryan

(57) ABSTRACT

Improved light emitting optics systems are provided for obtaining desired illumination patterns. Illumination assemblies and systems are provided that incorporate improved light emitting optics systems.

9 Claims, 16 Drawing Sheets

U.S. PATENT DOCUMENTS

| | | | |
|---|---|---|---|
| 5,656,823 A | 8/1997 | Kruangam | |
| 5,680,008 A | 10/1997 | Brandes et al. | |
| 5,753,928 A | 5/1998 | Krause | |
| 5,777,433 A | 7/1998 | Lester et al. | |
| 5,785,418 A | 7/1998 | Hochstein | |
| 5,793,044 A | 8/1998 | Mace et al. | |
| 5,841,177 A | 11/1998 | Komoto et al. | |
| 5,869,883 A | 2/1999 | Mehringer et al. | |
| 5,885,475 A | 3/1999 | Salyer | |
| 5,929,557 A | 7/1999 | Makishima et al. | |
| 5,940,683 A | 8/1999 | Holm et al. | |
| 5,945,217 A | 8/1999 | Hanrahan | |
| 5,952,680 A | 9/1999 | Strite | |
| 5,958,100 A | 9/1999 | Farnworth | |
| 5,959,316 A | 9/1999 | Lowery | |
| 5,966,393 A | 10/1999 | Hide et al. | |
| 5,969,872 A * | 10/1999 | Ben Oren et al. | 359/621 |
| 6,019,493 A * | 2/2000 | Kuo et al. | 362/335 |
| 6,227,669 B1 * | 5/2001 | Tiao et al. | 353/31 |
| 6,407,849 B1 * | 6/2002 | Steinblatt | 359/290 |
| 6,433,934 B1 * | 8/2002 | Reznichenko et al. | 359/622 |
| 6,547,421 B2 * | 4/2003 | Sugano | 362/268 |
| 6,611,382 B2 * | 8/2003 | Hashimoto | 359/619 |
| 6,657,393 B2 * | 12/2003 | Natsume | 315/82 |
| 7,077,552 B2 * | 7/2006 | Ishida | 362/545 |
| 7,300,177 B2 * | 11/2007 | Conner | 362/244 |
| 2002/0034081 A1 * | 3/2002 | Serizawa | 362/540 |
| 2005/0179041 A1 * | 8/2005 | Harbers et al. | 257/80 |

OTHER PUBLICATIONS

Opto Technology, Inc., "New Products-High Output Blue, Green, and Red LED Illuminators", www.optotech.com website, Copyright 1998.

Opto Technology, Inc. Spec Sheet, "High Power Red Illuminator," OTL680A-9-4-66-E, revised Jun. 1998.

Opto Technology, Inc. Spec Sheet, "High Power White Illuminator-Preliminary", OTLWHTA-9-4-66-E, revised Aug. 1999.

Opto Technology, Inc. Spec Sheet, "Very High Power High Power IR Illuminator", OTL880B-9-4-88-E, revised May 1998.

Diemat Product Data Sheet, "DM6030Hk Ag Epoxy Adhesive Paste", May 11, 1999.

John K. Roberts, "Binary Complementary Synthetic-White-LED Illuminators", International Congress and Exposition, Detroit, MI, Mar. 1-4, 1999, pp. 1-17.

Hewlett-Packard, Inc., "LED Stop Lamps Help Reduce the Number and Severity of Automobile Accidents", Application Note 1155-3, Copyright 1998.

Hewlett-Packard, Inc., "Thermal Management Considerations for Super Flux LEDs", Application Note 1149-4.

Hewlett-Packard, Inc., "Differences Between the SnapLED 150 and Super Flux/SnapLED Products", Application Note 1177, Copyright 1999.

Hewlett-Packard, Inc., High-Flux LED, Technical Data, Copyright 1999.

Hewlett-Packard, Inc., "SnapLED 70 LEDs", Preliminary Technical Data, Copyright 1999.

Hewlett-Packard, Inc., Super Flux LEDs, Technical Data Copyright 1998.

Hewlett-Packard, Inc., "Using Super Flux LEDs in Automotive Signal Lamps", Application Note 1149-1, 1999.

Epoxy Technology, "Products-Optical: Product Listing", www.epotek.com/optical_listing.html website.

Advanced Thermoelectric Products, www.electracool.com/moduleworking.htm website—"The Basics", 1999.

* cited by examiner

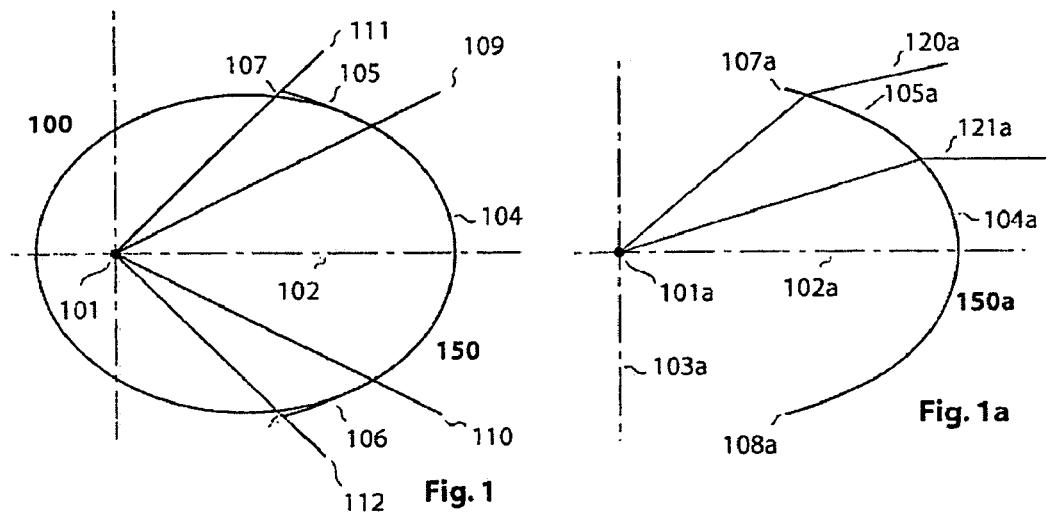
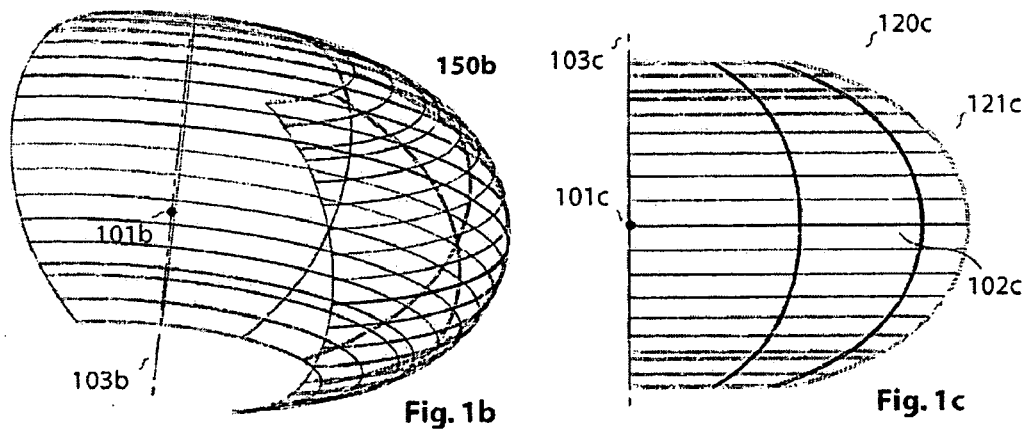
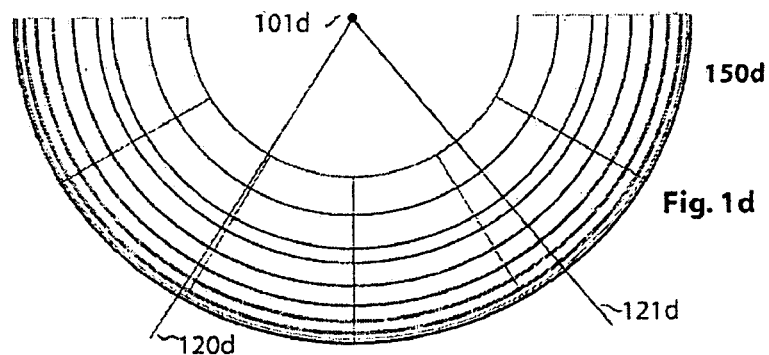

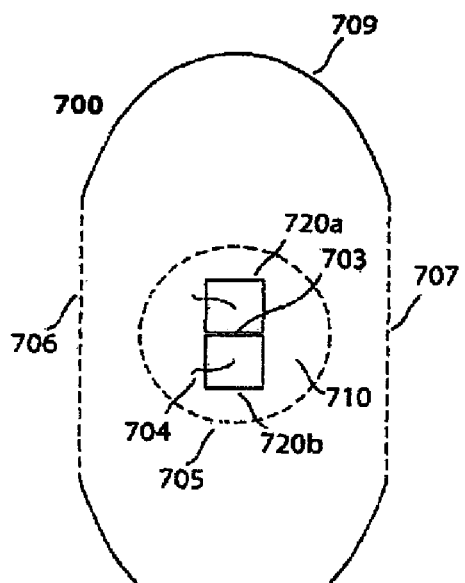
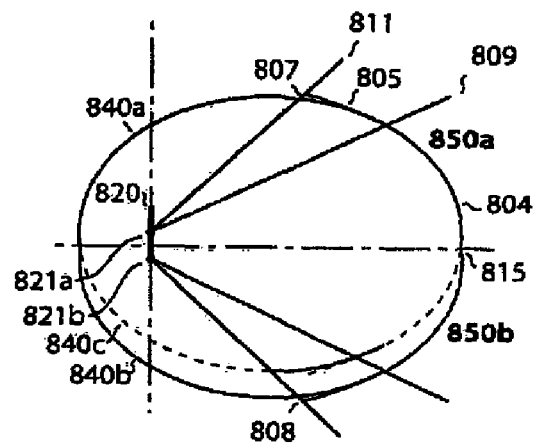
Fig. 8
Fig. 7
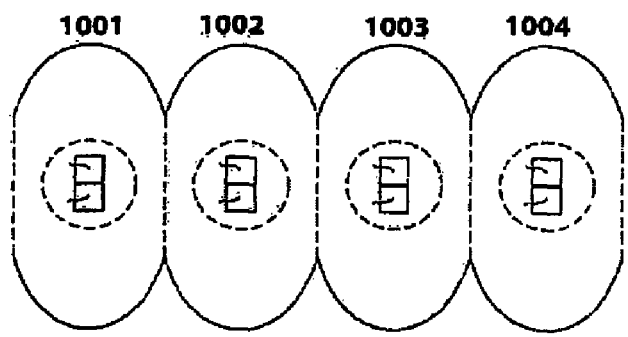
Fig. 10
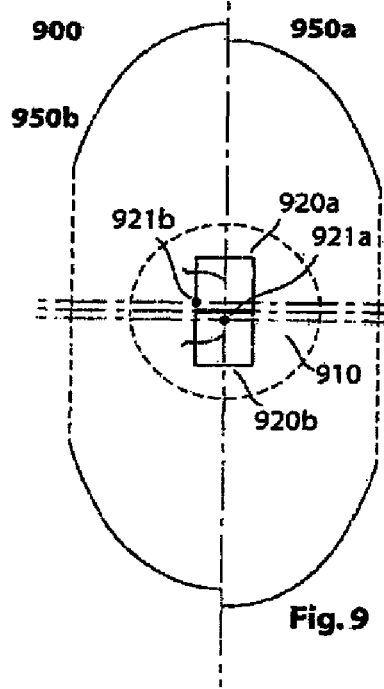
Fig. 9
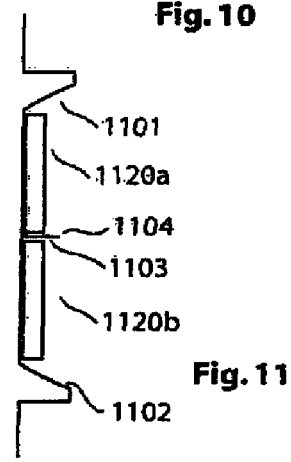
Fig. 11

LIGHT EMITTING OPTICAL SYSTEMS AND ASSEMBLIES AND SYSTEMS INCORPORATING THE SAME

CROSS REFERENCE TO RELATED APPLICATIONS

The present application claims priority, under 35 U.S.C. §119(e), to U.S. provisional patent application Ser. Nos. 60/652,101, filed on Feb. 11, 2005, and 60/707,075, filed on Aug. 10, 2005. The disclosures of these provisional patent applications are incorporated herein in their entireties by reference.

BACKGROUND

Many new illumination technologies are becoming commercially available, such as, high intensity discharge lighting, white light emitting diode lighting, halogen, bi-zenon and the like. The present invention provides improved light emitting optics systems for obtaining desired illumination patterns. Illumination assemblies and systems are also provided that incorporate improved light emitting optics systems.

BRIEF DESCRIPTION OF THE FIGURES

FIG. 1 is a cross-sectional view of a lens shape profile for a surface of revolution used for a lens element in a horizontal concentrator;

FIG. 1a is a portion of a curve from FIG. 1 which is used to generate an optical surface of an individual horizontal concentrator;

FIG. 1b is a perspective view of a surface generated by revolving the curve of FIG. 1a;

FIG. 1c is a side view of the surface generated by revolving the curve of FIG. 1a;

FIG. 1d is a top view of the surface generated by revolving the curve of FIG. 1a;

FIG. 2 is a profile of a series of lens elements, with each lens element having a profile similar to a profile of the portion of the curve of FIG. 1a;

FIG. 7 is a side view of an illumination assembly with LED dies;

FIG. 8 is a cross-sectional view of a lens shape profile for a surface of revolution used for a lens element in a horizontal concentrator similar to the view of FIG. 1, except with two LED dies;

FIG. 9 is a side view of an illumination assembly with two offset LED dies;

FIG. 10 is a side view a series of illumination assemblies;

FIG. 11 is a modified partial front view of the illumination assembly with LED dies of FIG. 7;

FIG. 13b illustrates the illumination pattern emitted from a lens element that has received the illumination pattern as depicted in FIG. 13a;

FIG. 14b illustrates the illumination pattern emitted from a lens element that has received the illumination pattern as depicted in FIG. 14a;

DETAIL DESCRIPTION

Figure 2:
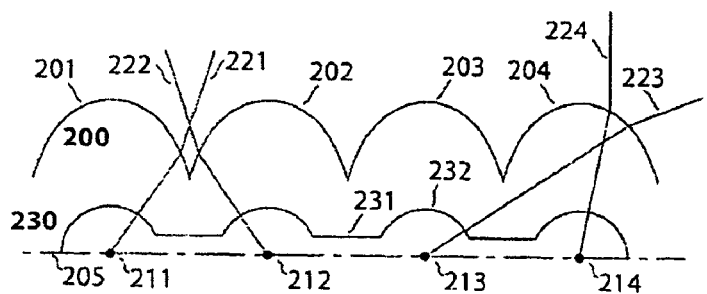

With the increasing efficiencies of light emitting diodes, it has become desirable to utilize them for headlamp lighting for automotive vehicles. The examples in this specification will focus primarily on the headlamp application. It should, however, be recognized that many of the features of this specification are applicable to other lighting systems and it is not intended that this invention be limited to headlamp applications. Detailed descriptions of automatic vehicle exterior light control systems that may incorporate such headlights are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316 and U.S. patent application Ser. Nos. 10/208,142, 09/799,310, 60/404,879, 60/394,583, 10/235,476, 10/783,431, 10/777,468 and 09/800,460; the disclosures of which are incorporated herein in their entireties by reference. To utilize the LEDs effectively, there are a number of challenges to be met by the optical system which projects light of a desired color in the desired pattern generally forward of the vehicle.

Many current proposals appear to be based on utilization of LEDs which emit blue or violet light and which have fluorescent materials which convert this energy into white light. Suitable individual illuminators and illumination assemblies that may be used with the present invention are disclosed in commonly assigned U.S. Pat. Nos. 5,803,579, 6,335,548, 6,441,943, 6,521,916 and 6,523,976, as well as, commonly assigned U.S. patent application Ser. Nos. 09/153,654, 09/835,238, 09/723,675, 10/078,906 and 10/230,804, the disclosures of which are incorporated in their entireties herein by reference. There are two general drawbacks to use of the blue or violet LEDs with a fluorescent coating. First, the cost of the LEDs per lumen emitted is generally higher than that of competing systems which mix light from LEDs of several different colors, for example, red, blue, and green and the overall efficiencies of such systems are typically somewhat lower. Secondly, the color temperature balance of many available LED lighting systems which utilize fluorescent material is high, i.e. very strong at the blue end of the spectrum and relatively weak at the red end of the spectrum. Such light is more annoying to other drivers than that from a more reddish or lower color temperature light source. There is more flexibility to optimize the effective color temperature of the light source when mixing light from LEDs of several colors. With such systems, the challenge is to properly mix the light of various colors from the individual LEDs to produce white light and to project it in the desired pattern of illumination. A particularly difficult requirement for any LED headlamp lighting system is to achieve a satisfactorily controlled and satisfactorily sharp transition between the upper extent of the low beam illumination pattern needed to illuminate the road in front of the vehicle and the much more dimly illuminated area just above this area of bright illumination needed to avoid subjecting drivers of oncoming and leading vehicles to blinding or undue annoyance glare.

The foregoing discussion is not intended to exclude LEDs which use fluorescent materials or systems which use combinations of LEDs having fluorescent materials with LEDs which do not have fluorescent materials; but, rather, to point out that the preferred structure of the present invention provides a method to mix the colors from LEDs of differing colors irrespective of whether they are of a fluorescent or non-fluorescent type.

One way to mix the light is to project substantially similar patterns of illumination of the component colors so that they overlay one another to produce light of the satisfactory color. For such systems, it is desirable to provide sources, including lensing, for LEDs of the various colors that are small enough so that they may be close to one another so that they tend to appear as a single white light source as opposed to appearing as an array of light sources of differing colors to oncoming drivers and others who may view the lights directly. A second reason to keep the sources small is that a relatively large number of LEDs are required to generate the required light intensity. When numerous individual lenses are used for individual or small subgroups of the LEDs, each lens must be accordingly small to limit the total headlamp light emitting area to a reasonable size. Small lenses exacerbate the problem of maintaining the sharp cutoff of the brightly illuminated area of the upper extent of the low beam pattern while, at the same time, maintaining reasonable efficiency in the proportion of the light from the LEDs which is projected into the headlamp lighting pattern.

To meet the diverse requirements of the optical system, it is desirable to share a common lens with a relatively large percentage or even all of the LEDs in a headlamp unit. It is also desirable to partition the optical components which serve to concentrate or establish the lighting pattern in the elevational direction with its critical requirements from optical components of the system which concentrate the light in the horizontal direction so larger lens dimensions may be used to meet the pattern requirements in the vertical or elevational direction and relatively smaller lens dimensions may be used to meet the less demanding requirements to pattern the beam in the side to side or horizontal direction thereby reducing the overall size of the headlamp system. In the preferred system, the vertical concentration component accepts partially overlapping patterns of illumination from multiple horizontal concentrator assemblies, each with their associated LEDs providing a more compact overall structure. Partitioning of the lens system with one component to perform the concentration in the horizontal direction and another component to perform the concentration in the vertical direction may also be used to advantage to separately characterize the patterns of illumination in the horizontal and the vertical directions. With increasing concern for fuel economy, it is further desirable to maintain a low profile for the front of the vehicle, so it is more important to keep the height of the headlamp very small than to necessarily keep a correspondingly small width. It is additionally desirable to share the lens system for all or for major components of the low beam and high beam lighting functions.

As will be described in detail, a preferred embodiment of the present invention utilizes an optical system which uses a first lens system to concentrate the light in the horizontal or side to side direction. This will be referred to as the horizontal concentrator. A second lens or lens system is used to concentrate the light in the vertical or elevational direction. This will be referred to as the vertical concentrator. The preferred system further uses one or more lens elements which are common to all or a large group of LEDs as the vertical concentrator to concentrate or pattern the light in the vertical direction. The preferred system utilizes a larger number of horizontal concentrators each with its lens or lenses and the associated group of one or more LEDs to concentrate light in the horizontal direction. In an exemplary system, several or perhaps all of the lens element surfaces in the horizontal concentrator are joined in a single piece of plastic. In a preferred system, however, in order to minimize thermally induced movement of the lens units of the individual horizontal concentrators relative to their associated groups of LEDs and also to facilitate mold design to provide a combined reflecting and refracting lens structure, each horizontal concentrator uses a separate plastic lens part. It should be understood that materials other than plastic, such as glass or other organic materials such as polycarbonate, polymacrylate and acrylic, may be used for the optic elements and/or lens. In the preferred structure, light from the LEDs first passes through the horizontal concentrator and then through the vertical concentrator. Thus, the lens elements in the horizontal concentrator are further designed to project the light in a pattern which may be effectively focused or utilized by the succeeding lens stage which serves as the vertical concentrator.

Various features of the preferred headlamp structure which operate in concert to enable proper performance of the system are as follows. The common lens which may contain multiple elements which concentrates light in the vertical direction is generally of a cylindrical design and the collection of lenses or lens surfaces which concentrate light in a horizontal direction each utilize lens surfaces which are generally surfaces of revolution where the axis of revolution is generally centered with the line of focus or the optical center of the cylindrical lens system of the vertical concentrator. Further, the LEDs are grouped in subgroups, each of which is associated with an individual horizontal concentrator. There is often an area in the field of illumination which is difficult to pattern such as the upper extent of the brightly illuminated area of the low beam pattern. It is normally preferable to select the area of each LED array which is projected into an area which is difficult to pattern in the field of illumination and to choose it generally as the optical center of the group of LEDs. For a lamp whose use includes the low beam function, this area which is difficult to pattern is preferably chosen as the area which projects as the upper extent of the bright portion of the illumination pattern of the low beam. The lens elements of the horizontal concentrators are designed such that their focal points or optical centers fall generally on their axis of revolution, and the axis of revolution is positioned to fall generally on the line of focus or optical center of the cylindrical lens system used as the vertical concentrator. Thus, the nominal centers of the LED clusters, the focal points or optical centers of the lens elements in the horizontal concentrator, the axes of revolution of the lens elements in the horizontal concentrator, and the line of focus or the optical center of the vertical concentrator are preferably approximately co-linear with one another. As will be described, various techniques including intentional defocus and shifting, stepping, or sweeping of effective focal points may be used to characterize the lenses of the vertical or horizontal concentrators so that the desired pattern of illumination is projected. With such lenses, there is generally a preferred center position for the light source which may be referred to as the optical center. It should also be noted that the optical system of this invention is intended primarily for applications to provide illumination and as such does not need to perform imaging functions. Some of the non-imaging properties such as intentional defocus will be used to improve uniformity of the projected pattern of illumination in addition to characterizing the pattern.

FIG. 1 depicts an example of the construction of the lens shape profile for the surface of revolution used for the lens elements in the horizontal concentrator. For a given index of refraction, a refracting lens which collimates light into parallel rays is best designed as an elliptical shape. For an elliptical lens 100, the nominal focal point is a focus point 101 of the ellipse. In the following, the term refractive angle will be used to indicate the number of degrees by which a specified light ray is bent as it passes through a boundary from a first medium having a first refractive index into a second medium which has a different second refractive index. For light rays passing from a medium of higher to a medium of lower refractive index, as the angle of incidence of the light rays to the lens surface increases relative to the normal to the surface, the refractive angle is increased and internal reflections also increase until at a critical angle of incidence the internal reflection becomes total. Thus, the magnitude of the refractive angles expected from the lens must be limited to maintain relatively high overall efficiency of the lens. For lens 100, the refractive angle required to bend light rays emanating from focal point 101 so that they are generally parallel to axis 102 is, for example, judged to be satisfactorily low for rays passing through lens surface 104 between bounding lines 109 and 110. Losses are generally lower for smaller refractive angles, so when multiple lens surfaces are used to perform a particular optical function, it is generally preferable to design the system to approximately equalize the maximum refractive angle which is provided by each of the lens surfaces, thereby approximately equally sharing the light ray bending function among the available optical surfaces. Rays emanating from focal point 101 and passing through areas 105 and 106 of the lens would have to be bent by a larger refractive angle to make them parallel to axis 102. Thus, to avoid the larger refractive angle and the reduced efficiency, the lens shape in areas 105 and 106 is changed from the elliptical shape and is designed to, for example, maintain a nominally constant refractive angle for rays emanating from focal point 101 and passing through these areas. Rays emanating from lens 100 through the regions between lines 109 and 111 and between lines 110 and 112 diverge modestly rather than being directed parallel to axis 102 but are still directed to an area where they are useful in the illumination pattern. When the focal point 101 is replaced by an LED or a small array of LEDs, the pattern of the projected light is enlarged generally in proportion to the dimensions of the emitting area relative to the overall lens dimensions. In lens 100, for proper collimation of the light rays, the ratio of the major to the minor diameter of the ellipse is established as a function of the ratio of the refractive index of the material on the inside of the lens to the refractive index of the material on the outside of the lens. Methods to determine the ratio of the minor to the major diameter of the elliptical lens 100 as a function of the refractive indices of the lens and of the surrounding material to focus light from a point source into a collimated beam may be found in textbooks on optical design.

In FIG. 1a, the portion of the curve from FIG. 1 which is used to generate the optical surface of an individual horizontal concentrator is depicted with the letter "a" appended to the corresponding numbers from FIG. 1. The curve is labeled 150a. Axis 102a is the major diameter of the elliptical surface on which the lens is based. Axis 103a is preferably in the plane of the elliptical curve, may pass through the focal point 101a and is preferably perpendicular to axis 102a. For purposes of illustration, it will be assumed that axis 103a does pass through focal point 101a. It will be used as the axis about which the curve from 107a to 108a is revolved to generate the lens surface for one of the horizontal concentrators. Ray 121a passes through an elliptical portion of the lens surface 104a of the curve 150a and is refracted so that it becomes nearly parallel with axis 102a. Ray 120a passes through modified non-elliptical area 105a of curve 150a and is refracted toward but not fully parallel to axis 102a.

In FIG. 1b, the focus 101b corresponds to focal point 101 in FIG. 1 and to point 101a in FIG. 1a. Axis 103b corresponds to axis 103a in FIG. 1a. The surface 150b is generated by revolving curve 150a about axis 103a. The angle through which the curve is revolved should be large enough to include the active part of the lens surface which may, for example, be 130° or a little more. It is convenient in many designs to revolve the curve through approximately 180° to generate this surface. This is what is depicted. In the preferred design, the interior of the surface is filled with the material (for example, polycarbonate plastic) having a higher refractive index than the exterior of this surface (air for example).

FIG. 1c is a side view of the lens 150b. A ray 121c emanating from focal point 101c and passing through the portion of the lens surface generated by the elliptical portion of the generating curve is refracted so that it becomes nearly parallel to the center plane of the lens. The center plane of the lens is shown in edge view as line 102c. Ray 120c emanating from focal point 101c and passing through the portion of the lens surface generated by the non-elliptical part of the generating curve is refracted toward but not parallel to central plane 102c.

FIG. 1d is a top view of the lens 150b. Rays 120d and 121d are the top views of rays 120c and 121c of FIG. 1c and point 101d is the end view of axis 103c and of focus point 101c which lies approximately on axis 103c. Because the lens is a surface of revolution with an axis of revolution which is perpendicular to the plane of this view, the projection of the normal to any point on the lens surface will lie along a line which extends through the axis of revolution. The focal point and the axis of revolution show as a point 101*d* in this view. Thus, in this view any ray which emanates from optical center point 101*d* and passes through the surface of lens 150*d* will have an angle of incidence relative to the normal to the surface which has a 0° component in this view. This indicates that the component of the refractive angle is also close to zero in this view and that in this view all rays including 120*d* and 121*d* appear to pass straight through the lens surface even though they may be refracted through a substantial angle in another view as is the case for the two rays 120*d* and 121*d* which are depicted. In the preferred configuration, the property of the horizontal concentrator to generally preserve the direction of propagation of rays as observed in a plane which is generally perpendicular to the line or path along which the light sources are situated is enabled by use of the surface of revolution or toroidal structure of the lens elements. The use of the surface of revolution in the preferred structure allows considerable latitude in the design properties of the generating curve which is revolved to generate the lens surface. For example, the curve may represent imaging or non-imaging optics either focused or defocused and may include reflecting or refracting surfaces either separately or in combination and may further include instances where a portion of the rays encounter zero, with one or more optical surfaces in their path from the light source through the toroidal structure to the vertical concentrator. It is preferable to place features such as the lower extent of the pattern of LEDs for the low beam which, for the preferred design, is projected as the upper extent of the brightly illuminated area of the low beam pattern close to the axis of revolution of the toroidal lens assembly. By doing this, the principles just described will be more strictly adhered to resulting in generally sharper definition of the required sharp cut off between the brightly illuminated region at the upper extent of the low beam pattern and the dimly illuminated portion just above it.

In FIG. 2, curve 200 is composed of curve sections or lenses 201, 202, 203, and 204 each having profiles similar to that of lens 150*a* of FIG. 1*a*. Further, these curve sections have respective optical centers or focal points 211, 212, 213, and 214 which all lie approximately on axis 205. The curve of 200 is rotated through an angle of, for example, 180° to generate the optical surface of a lens shown in various configurations in FIGS. 3, 4, 5, and 6. Even though FIG. 2 is shown primarily to represent the lens profile 200, this is a convenient place to illustrate several rays 221, 222, 223, and 224 which could logically apply to the actual lenses in any of the FIGS. 3 through 6. Ray 221 emanates from focal point 211 and passes through a portion of lens 201. Ray 222 emanates from focal point 212 and passes through a portion of lens 202. These rays are shown to illustrate that some of the rays from focal point 211 may pass through the concentrating lens but pass into the region normally thought to be associated with lens 202 associated with focal point 212 and likewise ray 222 emanates from focal point 212 and passes into the region normally thought to be associated with lens 201. Thus, portions of the cylindrical lens to be added in FIG. 4 will focus light rays from more than one of the horizontal concentrators with their associated light sources (i.e., the vertical concentrator will focus light from partially overlapping patterns of illumination). Ray 223 which emanates from focal point 213 does not pass through lens surface 203 but instead passes through the surface of lens 204. This ray is not effectively concentrated. Some of these rays, after possible additional reflection, may be emitted from the headlamp and contribute to the low-level diffuse lighting pattern which is also needed for the overall headlamp illumination pattern. Nonetheless, attention should be given to generally minimize the percentage of rays which are not projected into useful areas of the pattern of illumination. A later example will include reflecting optics to handle some of these rays and in some configurations, extra space may be needed between sections of the horizontal concentrator to minimize the number of rays which are blocked by the lens structure of a neighboring horizontal concentrator. Ray 224 emanates from focal point 214 and passes through the elliptical portion of lens 204 and should contribute to the most intense portion of the illumination pattern directly forward of the vehicle. Composite curve 230 which may, for example, be composed of straight line 231 and circular segments 232 is provided to illustrate a possible generator for the walls of an inner cavity of the lens which is preferably filled with a transparent fluid or a compliant transparent material to surround the LEDs to serve as a buffer for expansion coefficient differences and to provide convective and/or conductive cooling for the LEDs. It is preferred that the material used to fill this cavity be of a high refractive index to increase the critical angles for light rays emanating from the LEDs and allow more of the light rays to pass out of the LED chips rather than being reflected back into the chips due to total internal reflection. In some cases, the four curve segments of which circular segment 232 is representative may be arcs of circles centered on their respective focal points so that they will generate spherical cavities with the groups of LEDs nominally at each of their centers. With this configuration, mismatch in the refractive index of the material around the LED with the lens material will cause minimal change in the direction of the emitted light. In other cases, alternate shapes for the curves used to generate the central cavity may be used to intentionally make this interface part of the active lens structure. In the case that the refractive indices of the lens and fill material around the LEDs are relatively well matched, the lens effect due to this interface may be weak enough to be neglected and the shape of the cavities around the LEDs may have fewer restrictions. It may be desirable in some cases to use an inner cavity which is not a surface of revolution, but it should be kept in mind that what has been noted about the advantage of making the surface of the concentrating lens a surface of revolution about the focal center in order to preserve the focusing capability of a cascaded vertical concentrator applies to lensing effects at the internal interface as well as to the external interface of the lens elements of the horizontal concentrators. In the optional straight-line segments of which line 231 is representative, connecting the curved segments around each of the focal points may be used to generate passages joining the cavities around the LEDs. It is preferable that the area occupied by these passages be kept generally small enough and be positioned such that the passages intersect the cavities surrounding the LEDs in areas which are outside of those for which are part of the normal active optical paths for the concentrating lenses. Passages are optional and are normally omitted at the ends of the lens structure if fluid is contained within the structure.

Figure 3:
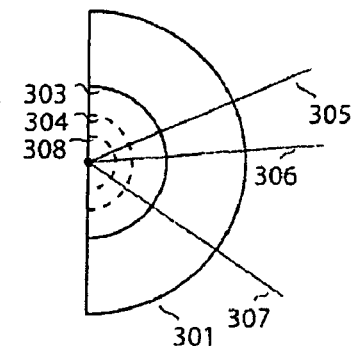
FIG. 3 depicts a profile view of a composite set of four lenses.

FIG. 3 is the end view (which is perpendicular to the axis of revolution used to generate the lens surface) of a composite set of four lenses designed to be the horizontal concentrators for four relatively concentrated light sources nominally centered at each of the four focal points of the lens array. Rays 305, 306, and 307 are representative of rays emanating from one of the focal points and this illustrates the point explained in connection with FIG. 1*d* that in this view (which is generally perpendicular to the axis of revolution of the lens) all of the ray traces of rays emanating from the line of focus or optical center at the center of revolution of the lens structure appear as nearly straight lines as they pass through and exit the lens array of the horizontal concentrator. Semicircle 301 is the outer extent of the surface of revolution for the lens structure and semicircle 303 is traced by the beginning and end points of each of the lens segments which make up the composite lens profile. Curves 304 and 308 depict outlines of the cavities supplied for the LEDs and the filling medium and the possible interconnecting passages between the cavities which are provided for the LEDs which are grouped at each of the focal points.

Figure 4:
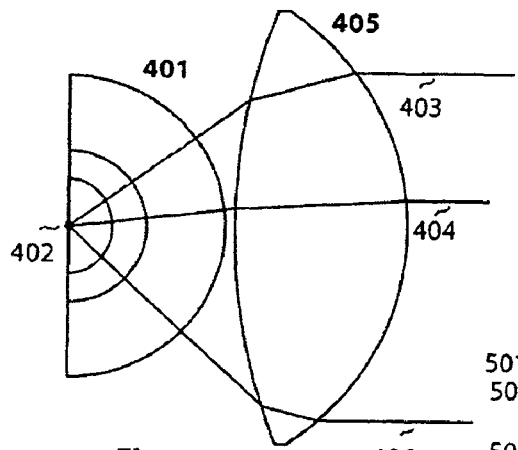
FIG. 4 is a profile view of LEDs, a horizontal concentrator and a vertical concentrator.

FIG. 4 is an end view of an optical structure having a row of appropriately clustered LEDs 402, a horizontal concentrator 401, and a vertical concentrator 405 which is preferably a cylindrical lens which may optionally be a multi-element lens and which is preferably shared by several or all of the clusters of LEDs which each have their associated horizontal concentrating lens elements. For reasons given before, the representative rays 403, 404 and 406, which emanate from focal line 402 travel in paths through the horizontal concentrator 401 which appear as straight lines in the end view of FIG. 4. Thus, for the ray traces of rays 403, 404, and 406 through horizontal concentrator 401 and vertical concentrator 405, the vertical concentrator 405 continues to function to focus light rays emanating from the vicinity of focal line 402 and passing through the toroidal lens structure of the horizontal concentrator 401 much as if the horizontal concentrator was not there. This permits the horizontal and vertical concentrators to be cascaded with the horizontal concentrator effective to concentrate or pattern the light primarily in the horizontal direction and the vertical concentrator effective to concentrate or pattern the light primarily in the vertical direction.

In FIGS. 2 through 6, four horizontal concentrating lenses are chosen by way of example. With available LEDs, it is anticipated that many more than four groups of LEDs will be needed to supply the required amount of light. In the structure, there are many available trades as to the number and size of LEDs grouped with each of the horizontal concentrators, the size of the horizontal concentrator, and the amount of current which may be supplied to each of the LEDs. Also, there is likely to be substantial thermal mismatch between the substrate on which the LEDs are mounted and the lens structure. In the design of the mechanical structure to accommodate these mismatches in expansion coefficients, the overall size of the plastic pieces is one of the factors. This may require separation of the horizontal concentrators possibly into individual units or into smaller subgroups of units rather than to incorporate all of the units into one long plastic piece. It is conceivable, for example, that there may be as many as 24 or more horizontal concentrators in the overall headlamp structure.

Figure 5:
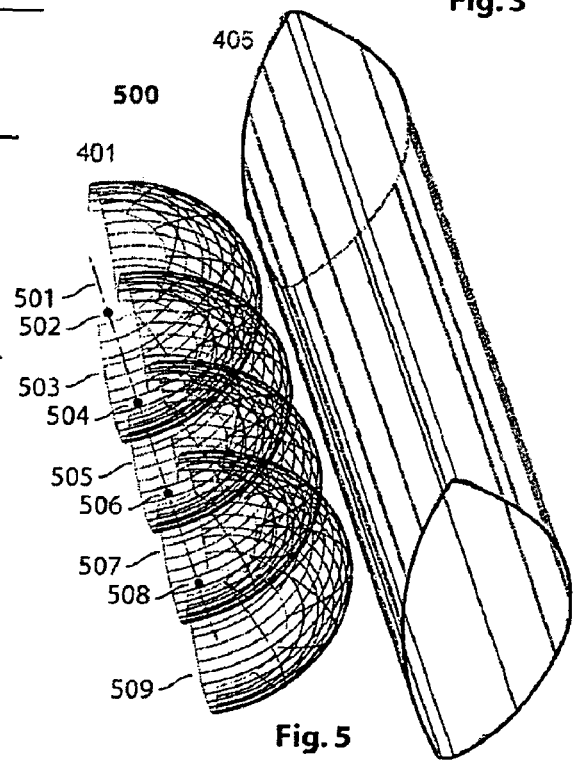
FIG. 5 is a perspective view of the LEDs, the horizontal concentrator and the vertical concentrator of FIG. 4.

FIG. 5 is a wireframe view of the lens surfaces of a lens assembly 500 having horizontal concentrator 401 and vertical concentrator 405. This is the assembly previously described and shown in an end view in FIG. 4. For purposes of illustration, there are four sections in the horizontal concentrator having lens surfaces 503, 505, 507, and 509 with respective optical centers 502, 504, 506, and 508. In application, there would probably be more horizontal concentrators and the light sources, preferably LEDs, would be nominally centered at the optical centers 502, 504, 506, and 508. The focal points or optical centers of the individual horizontal concentrators also preferably fall on or close to the axis 501. The vertical concentrator 405 is a cylindrical lens which is preferably common to all or to a significant subgroup of the horizontal concentrators. The vertical concentrator 405 preferably approximately shares a line of effective focus or optical center with the axis 501 which is preferably approximately the center of the surface of revolution for the lens surfaces in the horizontal concentrator and is also preferably approximately the line along which the effective focal points or optical centers of the lenses in the individual horizontal concentrators fall. The vertical concentrator 405 preferably extends modestly beyond the ends of the horizontal concentrator 401 in order to collect most of the light rays from the end units in the array of lens elements in the horizontal concentrator 401. As will be described in a later example, for LED sources of differing colors each with their associated horizontal concentrator, the common axis 501 is preferably replaced by individual axes for each of the concentrators and associated clusters of LEDs positioning each to accommodate the effective focal length of the vertical concentrator at the characteristic color of the associated clusters of LEDs with their associated horizontal concentrator. The individual axes tuned for the associated color will tend to be close to the representative axis 501 but the fine tuning is an important step much as color correction is important for a camera lens.

Figure 6:
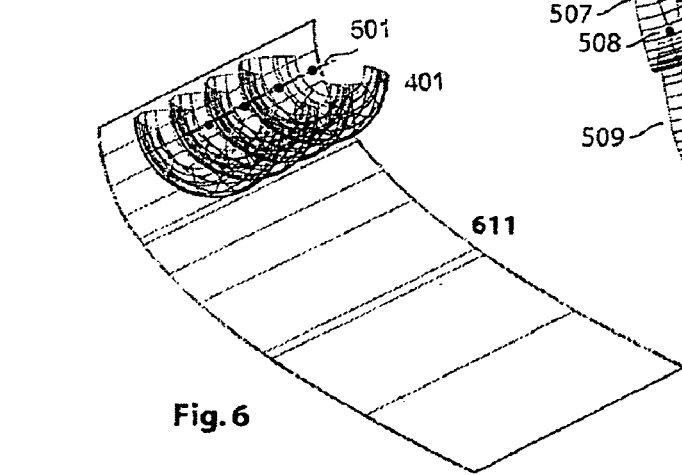
FIG. 6 is a second perspective view of the LEDs, the horizontal concentrator and the vertical concentrator of FIG. 4.

In FIG. 6, the horizontal concentrator 401 similar to the horizontal concentrator 401 of FIG. 5 is oriented to direct light rays generally downward into a cylindrical reflecting lens which preferably has an approximately parabolic cross section and which performs a function similar to that of the vertical concentrator 405 of FIG. 5. In FIG. 6, line 501 is the approximate axis of revolution of the horizontal concentrator, preferably the line along which the LED light sources are placed, preferably the line along which the focal points or optical centers of the horizontal concentrators lie, and also preferably the line of focus or optical center of the cylindrical parabolic reflecting surface 611. In this Figure, the term cylindrical is used in the more general sense for which parallel line generators of the surface may follow a path which need not be circular as for a circular cylinder. In the case of this example, the path which the parallel generator elements follow to generate the surface is a segment of a curve which is approximately parabolic.

In FIG. 7, the outline 700 of a section of the horizontal concentrator is shown with lens profile 709 showing at the top and lens profile 708 showing at the bottom. Boundaries 706 or 707 may either or both be sides of an individual horizontal concentrator or may be the lines of attachment to an adjacent horizontal concentrator or may be the end of a group of attached concentrators or may be a boundary for another lens section such as a reflective portion of the lens that adjoins the section which is shown. Dotted line 705 indicates the outline of a cavity preferably filled with a transparent fluid or preferably compliant transparent material 710 in which a single LED or a cluster of LEDs is preferably placed. The material 710 preferably has good heat transfer characteristics and preferably has a high index of refraction. In the example, there are two LEDs 720*a* and 720*b* having power attachments to the substrate and/or to connecting wires of which 704 is typical. In the design, the light emitting areas of LEDs 720*a* and 720*b* are preferably as close to each other as possible and the optical center 703 of the lens is preferably nominally centered between these two LEDs. In the configuration of FIG. 4 and FIG. 5, the illumination pattern is inverted in the vertical direction by the vertical concentrator so that light from LED 720*a* is generally directed to the lower portion of the pattern of illumination and light from LED 720*b* is normally directed toward the upper portion of the pattern of illumination with the line between the two LEDs generally falling toward the center of the total pattern of illumination. Thus, it is preferable to illuminate LED 720*a* for both the high and low beam modes and to illuminate LED 720*b* for the high beam mode only. It is preferable to choose the lower edge of LED 720*a* which projects into the field of illumination as the upper edge of the brightly illuminated area for the low beam pattern as the optical center of the two LEDs in the group. Depending on requirements of the design, it is not necessary that LEDs 720*a* and 720*b* be the same size or even that the placement be exactly symmetrical nor are the die necessarily square.

It is generally intended that when colors from various LEDs need to be mixed, light from LEDs of a particular color (which optionally include a fluorescent material) in one of the units, such as depicted in FIG. 7, be overlaid by light of another of the required color components from one or more other horizontal concentrators which have a pattern or patterns of illumination which are substantially similar to the one projected by the horizontal concentrator in FIG. 7 but which contain the LED or LEDs which emit light of other color components needed to achieve the desired color in the composite overlaid lighting pattern. Multiple groups of LEDs with their associated horizontal concentrators may project the same color in order to achieve the required intensity. For example, there may be six red, six green, and six blue concentrators projecting a total of 18 overlaid images with six projected images for each of the three component colors. As another example, the number of horizontal concentrators may differ for different colors depending on the brightness levels of the LEDs for each color and on the overall color requirements. To achieve the best color mixing, it is preferable that a set or subset of horizontal concentrators similar to the one depicted in FIG. 7 having the combination of colors to produce light of the desired color project substantially overlaid similar patterns so that the color of the composite, overlaid, projected patterns of light tends to be correct and satisfactorily uniform.

Segmenting the pattern of illumination into more or less discrete areas to be covered by various subgroups of modules similar to that in FIG. 7 tends to increase the size of the lenses that are required. Thus, it is desirable to fill as much of the overall pattern of illumination as practical with light from as many of the subunits similar to FIG. 7 as practical. While generally following the principle above, some modification or variation in the illumination patterns of individual or sub groups of units similar to that of FIG. 7 is desirable for the following reasons. Features such as the die bonding area where electrical attachment is made to the illuminating surface of the LED or the gaps between multiple LEDs will tend to project poorly illuminated areas in the field of illumination. One way to counteract this effect is to modestly dither the positions at which anomalies in the illumination patterns appear for individual units, such as that of FIG. 7. In so doing, adequate correlation should be maintained between the illumination patterns of the various color components in order to achieve satisfactorily uniform color in the resulting composite illumination pattern. The overall effect is to stagger areas of inadequate illumination in the overall patterns of individual or of subgroups of the lighting modules so that inadequacies of one subgroup are at least partially offset by the lighting pattern of other subgroups in the array. Other techniques including diffusion and intentional defocus particularly for the horizontal concentrator may be used to minimize these artifacts. In general, however, it is desirable to selectively apply diffusion or defocus characterizing to be greater in the horizontal direction. Diffusion or defocus needs to be generally limited in the vertical direction in order to prevent too much softening of the sharp cut off between the brightly and dimly illuminated regions in the vertical lighting profile. In general, the effects of diffusion mitigate against the ability to create a sharply defined pattern of illumination with a lens system of a given size and should accordingly be used sparingly. As will be described later, generally non-planar features such as the baffle 1103 with protruding forward edge 1104 which is depicted in FIG. 11 may be added and the position of the optical center may be chosen as the forward edge 1104 bringing edge 1104 into relatively sharp focus to project a sharply defined upper edge on the low beam pattern of illumination, for example, to preserve adequate definition in the projected pattern of illumination while defocusing areas of the LED surfaces permitting areas such as gaps between adjacent LEDs to be defocused to reduce the non-uniformity in the projected field of illumination due to these features. Features including adjustment of relative sizes of the LEDs of differing colors and lens designs specific to the colors which they project may be individually characterized for the individual sections similar to that of FIG. 7 to optimize each unit for the color of the light which it is projecting. The position of each horizontal concentrator unit and its associated LEDs should be adjusted to the line of best focus for the vertical concentrator at the color projected from the LEDs in the unit. As an example, for polycarbonate, focal lengths are significantly shorter at the blue end of the spectrum than at the red.

In some headlamps systems, particularly HID headlamps, it is a normal practice to make the upper extent of the brightly illuminated portion of the low beam on the side that illuminates the side of the road higher than it is on the side which is normally projected into the lane of oncoming vehicles. The configuration which has been described so far is best adapted to provide a relatively straight line of demarcation between the brightly and dimly illuminated areas at the upper extent of the low beam pattern of illumination. In FIG. 8, some modifications are made to the optical design described in FIGS. 1 through 7 in order to provide a modest side to side elevational offset in the upper extent of the brightly illuminated region of the low beam pattern of illumination while still adhering generally to the previous teachings of the patent.

In FIG. 8, the elliptical portion 840*a* and the dashed elliptical portion 840*c* taken together are the general elliptical shape similar to that depicted in FIG. 1. Point 821*a* is the focus of the ellipse and features 807, 811, 805, 809, and 804 generally correspond, respectively, to features 107, 111, 105, 109, and 104 of FIG. 1. The view in FIG. 8 includes the profile from 807 to 815 to 808 of the lens taken generally through its midsection in the horizontal plane. Line 820 represents a top front profile view of the LEDs similar to those shown as LEDs 720*a* and 720*b* in a front view in FIG. 7. The curve segment 840*b* is preferably elliptical in shape and is offset from the portion 840*a* so that its focal point falls generally at the edge of LED 820 has shown. As will be illustrated in FIG. 9, a first portion of the lens is a surface of revolution and its associated axis of revolution and focal point 821*a*. It is generated by revolving the curve 850*a* which extends from 807 to 815 about an axis through its focal point 821*a*. The focal point and axis of rotation are offset modestly in the vertical direction from the second portion of the lens which is generated by revolving the curve 850*b* which extends from 815 to 808 about an axis through its focal point 821*b*. Since this is a top view, the point 821*b* which appears below point 821*a* in FIG. 8 appears to the right of point 821*a* as viewed by the driver of a car in a normal automotive headlamp application with configurations as depicted in FIGS. 4 and 5. In this orientation in the vehicle for a normal headlamp application, the portion of the lens associated with focal point 821*b* will generally direct light from LEDs 820 to the driver's right side of center and a cylindrical vertical concentrating lens as depicted in FIG. 4, 5, or 6 will generally preserve this directional orientation in the horizontal direction.

In FIG. 9, a profile 900 of a lens uses the profiles described in connection with FIG. 8 to generate the lens surfaces. The lens constructed according to the description in FIG. 9 may, for example, be applied in a general configuration as depicted in FIG. 4 or 5. The lens profile 900 is similar to the profile of FIG. 7 but has modifications to modestly elevate the upper extent of the profile of illumination generally to the right of center as viewed by the driver of a vehicle in which a headlamp of this design is employed. Portion 950b of the lens has focal point 921b generally located on its axis of revolution 907b which is positioned modestly above the focal line 907 of the vertical concentrator and also positioned generally to the left edge of the array of LEDs 920a and 920b as viewed in FIG. 9. These sides would be reversed for countries where traffic preferentially uses the left lane. The modest elevational offset of axis of revolution 907b upward from focal line 907 modestly elevates the upper edge of the pattern of illumination which is projected from the lower edge of LED 920a which is illuminated without illuminating LED 920b during low beam operation. As with FIG. 7, both LEDs 920a and 920b are illuminated during high beam operation. As indicated in the discussion of FIG. 8, offset of the focal point 921b to the left edge of the array of LEDs results in projecting a pattern of illumination from section 950b of the lens which falls generally to the right of center as viewed by the driver of the vehicle in which the headlamp is employed.

Portion 950a of the lens has focal point 921a generally located on axis of revolution 907a which is positioned modestly below the focal line or line of the focal line 907 of the vertical concentrator and also positioned generally on the vertical centerline of the array of LEDs 920a and 920b. The modest elevational offset of axis of revolution 907b downward from line focus 907 modestly lowers the upper edge of the pattern of illumination which is projected from the lower edge of LED 920a. LED 920a is illuminated without illuminating LED 920b during low beam operation. By slightly elevating axis of revolution 907b from focal line 907 and by slightly lowering axis of revolution 907a from focal line 907, the three axes are kept close together thereby minimizing aberrations in the optical system which degrade the sharp transition between the brightly and dimly illuminated portions of the pattern of illumination for the headlamp in the low beam mode. As in FIG. 7, a material 910 which preferably has a relatively high index of refraction and good heat transfer properties is used to fill the cavity in which the LEDs 920a and 920b are placed.

Color compensation gave a reason to individually adjust the axes of revolution and placement of focal centers of the clusters of LEDs for different horizontal concentrating units. FIGS. 8 and 9 illustrate the use of multiple axis of revolution for various portions of the lens structure within an individual horizontal concentrator lens unit in order to refine the pattern of illumination projected by the unit. This technique is applicable to other features in other embodiments of this invention. For example, as an option in FIG. 26, the curves 2605 and 2607 used to generate a reflecting surface and an exit window for the reflected light might be revolved about an axis preferably close to but optionally distinct from centerline 2607 about which other portions of the profile are revolved to generate the lens surface. And such adjustment may be done to adjust the resulting pattern of illumination. In this particular case, the position and/or shape of the bright center spot into which the reflecting surfaces generated by curve 2605 preferably project a portion of their light might be adjusted. The similar segment 2625 might be rotated about the same or yet another axis than curve 2605. Additionally, the generally toroidal surfaces need not be pure surfaces of revolution and the generally cylindrical surfaces need not be purely cylindrical. Such modifications might be viewed in somewhat the same way that aspheric surfaces are used in lens systems whose surfaces are predominantly spherical in order to meet certain requirements more readily than if the system is limited to spherical elements only. As the general similarity of the aspheric elements to their spherical cousins is usually retained, the same may be true of nearly or approximately toroidal or cylindrical surfaces used as elements within this invention.

In the modifications of areas 105 and 106 in the lens profile of FIG. 1, the shifting of optical centers and the modest offsets of axes of rotation are a few techniques which may be employed to characterize the illumination pattern in the lens assembly. In the example of FIG. 1, areas 105 and 106 of the curve were modified to characterize the pattern of illumination in the horizontal direction and to enhance the performance of the lens system. In FIGS. 8 and 9, offset in effective focal points for portions of the lens resulted in further characterization of the pattern and further offsets in the axes of rotation of portions of the lens elements were used to introduce modest changes in the vertical illumination pattern as a function of the position in the horizontal field of view. Intentional misfocus is another technique which may be used to characterize the illumination pattern projected by the concentrators.

In each of these cases, the separation of the vertical concentration and the horizontal concentration of the light rays into two at least partially separate cascaded lens systems served as the basis to allow separate characterization of the pattern of illumination in the vertical and horizontal directions. The directions for which the respective concentrators are operative to perform the light concentrating functions do not need to be horizontal and vertical for all applications or even for all headlamp lighting applications. It is however, preferred that the optical system include two concentrators for which the direction in which the first concentrator is operative to achieve a concentrating effect is approximately orthogonal to the direction in which a second concentrator is operative to achieve a further concentrating effect on light which has passed through the first concentrator. More generally, it is preferred that the optical system includes two cascaded light concentrating stages where the second stage is operative to concentrate light rays in a direction which is different from the direction that the first concentrator is operative to concentrate light rays.

FIG. 10 illustrates an array having four horizontal concentrators 1001, 1002, 1003, and 1004 with their associated arrays of LEDs. As noted earlier, in many embodiments, a full headlamp assembly will have substantially more groups of LEDs and associated horizontal concentrators than are shown in FIG. 10. FIG. 10 is intended as a simplified illustration of how the multiple horizontal concentrators may be grouped together and as the basis for a discussion of how individual colors may be used in each of the horizontal concentrators to provide light of a desirable color by overlaying individual color components from multiple sections of the horizontal concentrator. The assembly is pictured with individual sections as described in FIG. 7 but may also be constructed with sections as described in FIG. 9. Full white or various combinations of colored LEDs, not necessarily having the same number of LEDs of horizontal concentrators for each color, may be used to generate white light of the desired color balance. It is preferred that color rendering be good, particularly, for the colors of safety related objects such as the red for stop signs and the yellow for warning signs. For example, some combination of red, amber, green, and blue might be used or optionally amber and blue-green augmented by red or simply a combination of red, green, and blue LEDs may be combined to produce the white light. With the relatively high intensity of the light sources which increases their apparent sizes to a person viewing them and with the relatively close spacing of, for example, two or more horizontal concentrators per inch, it is anticipated that when viewed directly at a distance by an oncoming driver, the individual colors of the LEDs will tend to blend to appear as a white light source. At close distance, an observer will see the distinct colors, however, as spacing between the individually colored sources decreases and as intensity increases, the distance at which individual colors will be observed by directly viewing the headlamp source is decreased. It is preferable to order the colors of the concentrators in the array so that complementary colors tend to be adjacent to one another and so that the number of horizontal concentrators before the pattern approximately repeats is made small to reduce the effective spacing between repetitions of the color sequence in the array of horizontal concentrators.

As one more specific example, horizontal concentrator 1001 may use red LEDs, horizontal concentrator 1002 may use green LEDs, and horizontal concentrator 1003 may use blue LEDs. Horizontal concentrator 1004 may use red LEDs as the start of the next set of three colors and additional horizontal concentrators not shown may continue this repeated pattern. Preferably, sub groups, for example in this case horizontal concentrators 1001, 1002, and 1003 which are a subgroup having all of the component colors, should project their light into substantially similar patterns of illumination so that the light from the sources in the subgroup will mix over the pattern of illumination to yield light of a color balance which is acceptably close to white. Additional subgroups of the horizontal concentrators whose color components mix to produce the desired color may project a pattern of illumination which additionally overlays the pattern illuminated by another similar set or, optionally, may be designed to illuminate a different, perhaps partially overlapping, area in the overall pattern of illumination.

FIG. 11 depicts a pair of LEDs 1120*a* and 1120*b* which may correspond to LEDs 720*a* and 720*b* of FIG. 7. A reflecting ridge 1101 has been added around the periphery of the LEDs. Preferably, the reflecting surfaces are specular but may optionally be diffused or partially diffused. It is generally desirable to keep the reflecting surfaces of which ridge 1101 and ridge 1102 are representative close to the boundaries of the light emitting diodes. The light reflected from these areas must then be taken into account in designing the lens system for the overall pattern of illumination. For low beam operation, LED 1120*a* is illuminated and LED 1120*b* is not illuminated. Because of the high contrast required between the bright and dimly illuminated areas of the low beam pattern, rays of light from LED 1120*a* which may strike and may be reflected from surfaces which surround LED 1120*b*, for example from ridge 1102, may project too much light into the dimly illuminated area. To prevent this, a baffle 1103 may be placed between LED 1120*a* and LED 1120*b*. This baffle 1103 is preferably thin so the LEDs may continue to be close together and preferably not higher than required since some rays reflecting from it may be projected into the area which is to be dimly illuminated. The baffle 1103 is preferably reflecting. If the forward edge 1104 of the baffle 1103 extends beyond the surface of the LEDs, as an option, the focus or optical center of the horizontal and vertical concentrators may be adjusted somewhat away from the LEDs surface and generally toward the forward edge 1104 of the baffle 1103. This may be done so that the general defocus of the imaging surface will lead to additional smoothing of the image. This is a way to defocus the vertical concentrator except at the critical edge which projects as the upper edge of the brightly illuminated area of the headlamp low beam pattern of illumination. This technique may help considerably to blend areas between LEDs so that they do not project dark lines in the field of illumination.

This discussion points to another issue which may be addressed in the design not only here but in the entire design to accommodate differences in the patterns of light emission from LEDs of various types or colors or types. Some LEDs will emit more light from their edges than others and additionally the angular distribution of the light emitted may be different and even the intensity and the directional profiles of the light emitted may vary over the surface of the die. In general, these factors may be investigated experimentally and features such as sizes and configuration of various dies and individualized adjustments in the lenses for individual horizontal concentrators for various die colors and/or types are preferably made to improve matching of the resulting patterns of illumination so the mixing of the colors is improved to produce the desired resulting color balance preferably over the entire area of illumination.

FIG. 6 illustrated the use of a reflecting lens for the vertical concentrator. In general, there are many options for the optical elements in both the horizontal and the vertical concentrators which are in the scope of this intention. Fresnel lenses of refracting and/or reflecting types may replace the lenses which have been used. Combinations of refracting and reflecting lenses may be used either by application of reflective coatings or through the use of total internal reflection. Reflecting lens surfaces which are generally surfaces of revolution about their focal point may be used to augment, replace, or partially replace the refracting lenses of the horizontal concentrators. One of the ways to characterize the pattern of illumination is to intentionally defocus either an entire or a portion of a lens surface, this is another way of looking at the modifications made to areas 105 and 106 in FIG. 1. These techniques to intentionally deviate from using sharp focus in portions of the lens design are considered to be within the scope of this invention. It should also be understood that the examples of the exemplary embodiments which were described are directed toward a specific automotive headlamp application.

In other applications, the vertical concentrator may be oriented in a non-vertical direction and the horizontal concentrators may be oriented in a non-horizontal direction. Each of the cascaded concentrators should preferably have a given direction in which it is operative to preferentially concentrate light and it is preferred that the given direction of preferential concentration for the second of the cascaded concentrators be approximately perpendicular or orthogonal to the given direction for the first concentrator. It is presumed that the scope of the invention extends beyond the specific horizontal and vertical orientations described in the preferred embodiments. Other applications including other headlamp applications may employ concentrators which are operative to concentrate light in preferential directions other than horizontal or vertical. In certain other applications, the functions of the horizontal and vertical concentrators may be interchanged from what has been described in this specification. That is, it is presumed that the entire optical system may be rotated to an entirely new orientation and remain within the scope of invention.

Transparent materials having high indexes of refraction have been formulated by, for example, mixing nanoparticles of silicon in silicones, or epoxies. With some of these materials, high indexes of refraction have been achieved. One possibility with the present design is to use a fluid or moldable solid which has an index of refraction which is substantially higher than that of the surrounding plastic to fill the cavity surrounding the LEDs. The wall of the cavity then becomes the surface of a positive lens and may be designed either as the primary lens surface or as one of the lens surfaces in a multi-element lens structure for the horizontal concentrating function. In the case that it performs the primary horizontal concentrating function, the exterior of the containing plastic may serve either as an element in the vertical concentrating lens or may possibly perform the entire vertical concentrating function. Another option is to provide either single or arrays of micro lenses on the surfaces of either individual or multiple LEDs in the groups of LEDs which are associated with each horizontal concentrator. It is preferred that the micro lenses be made of the materials such as a mixture of nanoparticles which has an index of refraction which is significantly higher than that of the surrounding lens or encapsulating material.

As an alternative, the material which incorporates a mixture of nanoparticles to achieve high index of refraction may simply be used as the preferred high index of refraction material to fill a more conventional cavity surrounding the LED structures in a configuration as previously described.

Figure 16:
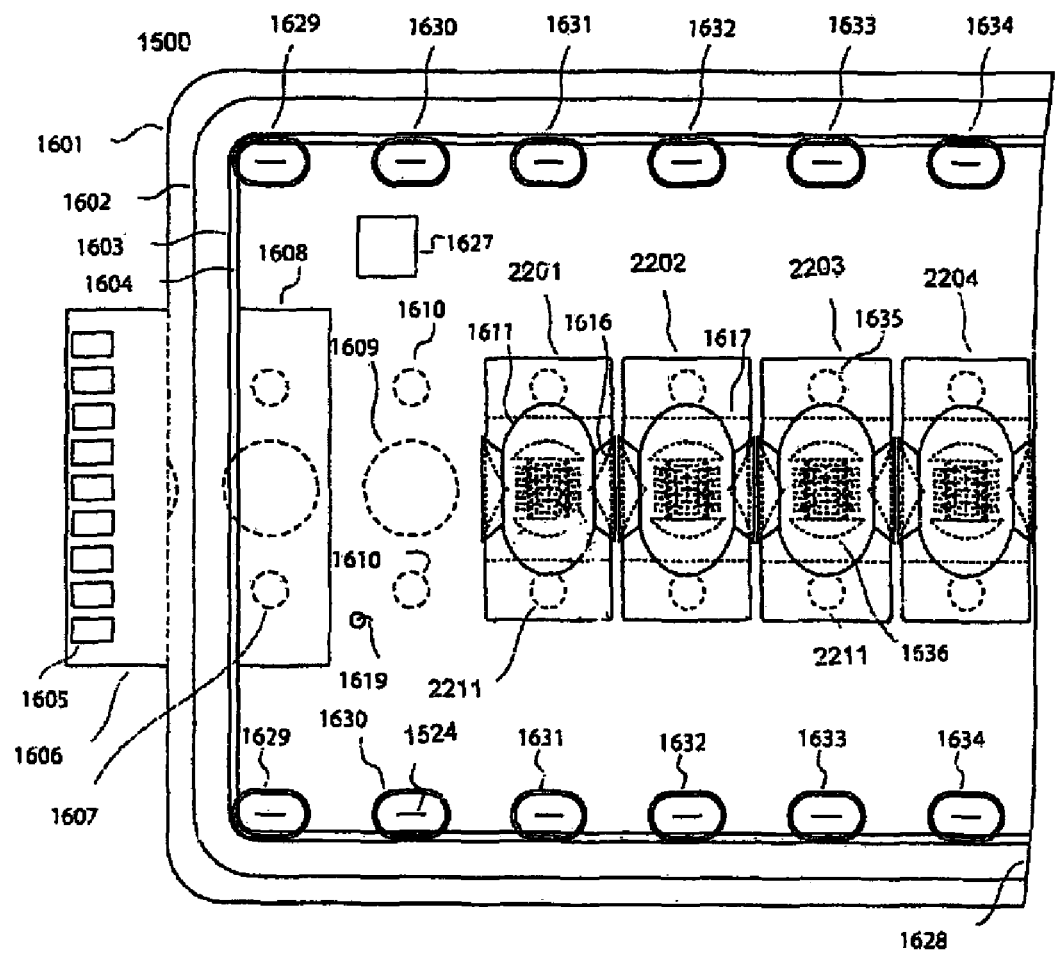
FIG. 16 is a front view of the headlamp assembly of FIG. 15 with a vertical concentrator removed.
Figure 22:
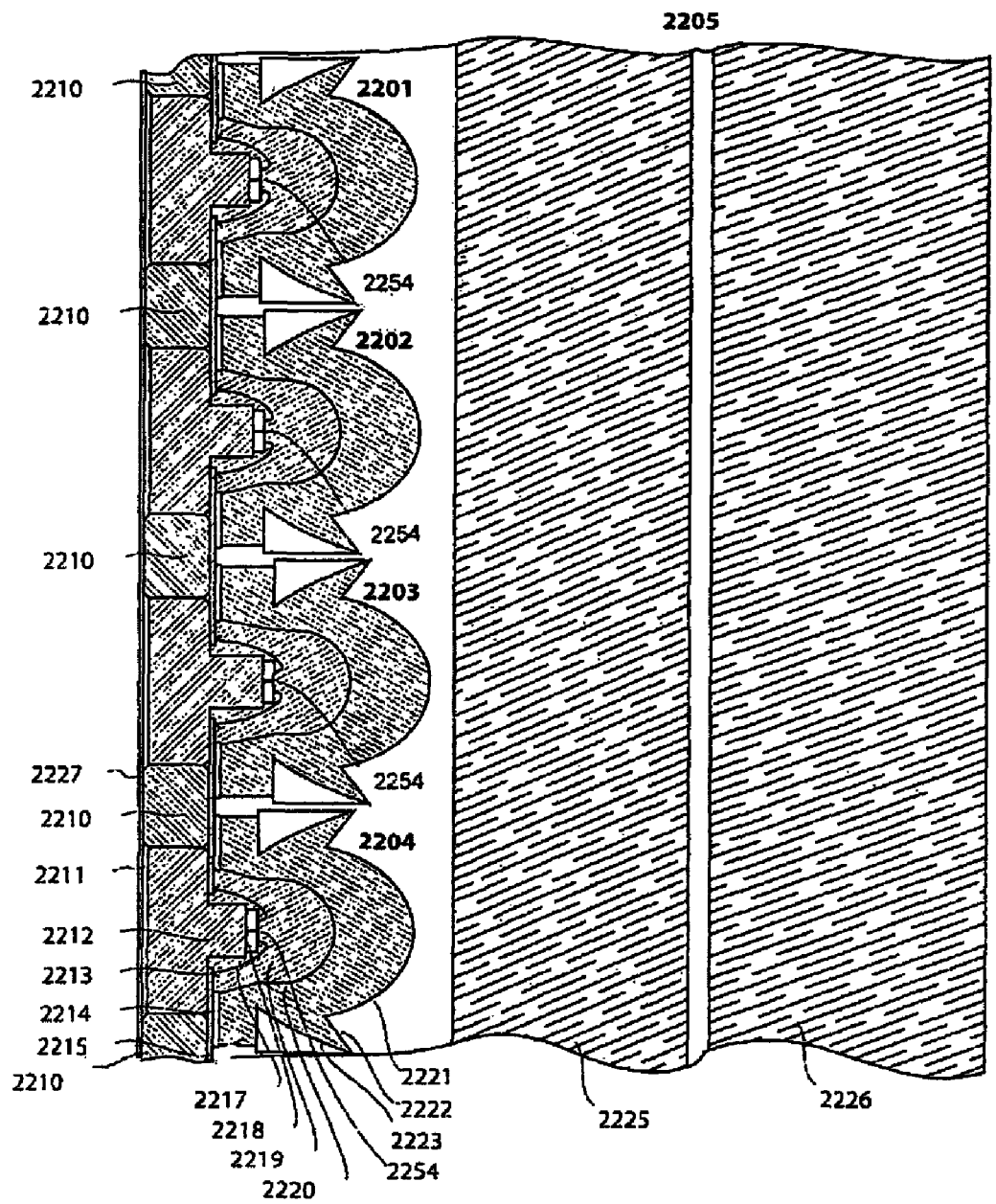
FIG. 22 is a second cross-sectional view of the headlamp assembly transverse to the first cross-sectional view of the headlamp assembly of FIG. 15.

FIG. 22 is a cross-sectional view from the top of a preferred structure passing directly through the centers of the vertical concentrator 2205 having a two element cylindrical lens structure in the longitudinal direction. FIG. 22 illustrates a longitudinal cross section taken directly through the center of an outer cylindrical lens element 2226 of the two element cylindrical lens structure making up the vertical concentrator 2205. FIG. 22 also illustrates a similar longitudinal cross section taken through the center of an inner cylindrical lens element 2225 of the vertical concentrator 2205. The fragmentary view depicts a portion of a base assembly with its arrays of LEDs and associated horizontal concentrators 2201 through 2204, each having a toroidal lens structure. The total structure may contain many more than the four horizontal concentrators with their associated LEDs which are depicted. This view illustrates the sharing of a single vertical concentrator with multiple horizontal concentrators and LED assemblies. FIG. 16 is a front view of the same structure which includes a portion of the end of the structure not shown in FIG. 22 and which does not include the detail shown here on the cylindrical lens elements of the shared vertical concentrator 2205.

For most transparent refractive materials, the index of refraction is higher for shorter wavelengths resulting in a shorter focal length for blue than for red and intermediate focal lengths for colors such as green or amber. In the preferred structure, LEDs of similar or preferably identical colors are grouped together in individual horizontal concentrators and the projection of patterns of illumination of the various component colors which overlay one another is preferably utilized to perform at least a portion of the color mixing function. One of the significant advantages of this arrangement is that lens design and component positioning may be adjusted individually for each of the horizontal concentrators to accommodate the index of refraction with its resulting focal length and possibly other lens properties for the individual wavelength range of the LEDs in each of the particular horizontal concentrators. In FIG. 22, the position of each of the groups of LEDs and the associated toroidal lens structures in the horizontal concentrators 2201 through 2204 is individually selected based on the color of the LEDs in the respective structures so that each is at the proper focal distance from the inner cylindrical lens element 2225 and the outer cylindrical lens element 2226 of the vertical concentrator 2205 to attain proper focus and proper lens performance for the colors of the LEDs for each of the individual units. For example, in the exemplary structure which is substantially enlarged in FIG. 22, the nominal focal length of vertical concentrator 2205 may be about 10 mm, and depending on optical properties of the lens material, this nominal focal length may vary by approximately 0.3 to 0.4 mm between best focus for red and best focus for blue. Thus, in the unit as depicted, the horizontal concentrator 2201 has red LEDs so that the LEDs and associated toroidal lens structure are placed farther from the lens structure of the vertical concentrator 2205 to properly focus the concentrator for the red wavelength for which the index of refraction is lower. The toroidal lens structure of the horizontal concentrator 2203 has blue LEDs so that the LEDs and lens structure of the associated horizontal concentrator are placed closer to the lens structure of the vertical concentrator for proper focus of the concentrator for the blue wavelength for which the index of refraction is higher. The horizontal concentrator 2202 preferably has green or amber LEDs and the distance of its LEDs and associated toroidal lens structure from the lens structure of the vertical concentrator 2205 is between that of the red unit of the horizontal concentrator 2201 and the blue unit of the horizontal concentrator 2203 so the distance of its placement relative to the lens structure of the vertical concentrator 2205 is between that of the red and blue units.

With the very low F number optics which are used to efficiently collect the light from the LEDs and direct it into the required pattern, the color aberrations of the preferred system would be very large without adjustments of focal lengths to accommodate the individual color components. In the preferred system, light from individual sources having differing and more restricted color distribution is processed in partially individualized, parallel optical paths and focal lengths are adjusted to individually accommodate light of different color distributions within these individualized optical paths within the optical system. For systems which do not utilize sources of differing colors or which do not contain the individualized optical components, color corrected lenses which utilize combinations of lens materials and color correction techniques such as those used in photography may be employed to achieve the needed color correction. Other techniques which may be used to achieve color correction include the use of a combination of diffracting and refracting optics to implement color correction and/or the use of reflecting optics which, in general, do not exhibit the serious color aberration problem. The use of color corrected lenses for the optics is within the scope of this invention but does normally add to complexity and cost given the desire to use plastic lens elements and the limited selection of transparent plastic materials which are suitable for lens applications in the difficult automotive environment.

The horizontal concentrator 2204 which includes its associated red LEDs may be the start of another, for example, red, green, blue sequence of horizontal concentrators and is illustrated accordingly positioned for a focal length similar to that of the red unit of the horizontal concentrator 2201. The profile view includes refracting lens portion 2221, reflecting lens portion 2223, exit surface 2222 for the reflecting lens portion 2223, and inner cavity profile 2220, all of which preferably form a profile for a lens which is generally a surface of revolution, preferably about an axis which runs in the plane of the paper, is preferably approximately parallel to and preferably approximately coincident with the focal center of vertical concentrator 2205. Further, this axis of revolution is preferably positioned on or close to the optical center 2254 of the cluster of LEDs in the horizontal concentrator 2204. The horizontal concentrators are preferably keyed to a heat conducting base 2210. The heat conducting base 2210 preferably extends over the back of most or all of the LED headlamp unit. LED mounting posts 2212 are preferably of a good heat conducting material such as copper and are preferably pressed into holes 2211 in the heat conducting base 2210 so that good thermal and electrical contact is provided between LED mounting posts 2212 and the heat conducting base 2210. A circuit 2215 may, for example, be fabricated from polyimide insulated flex circuit material which may be bonded to the heat conducting base 2210. The circuit 2215 preferably extends partially over the hole 2211 into which the LED mounting post 2212 is pressed and the mounting post 2212 preferably has areas, preferably flat, which serve as a rigid backing for the circuit 2215 in the areas where it extends over the mounting post structure. The circuit 2215 has bonding pads or other LED electrically conductive attachment mechanism to terminate bond wires 2217 at points such as 2213. The other end of the lead bond wires connect to the LEDs 2218. A cavity 2219 formed by the inner cavity profile 2220 is preferably filled by a relatively flexible transparent material such as a silicone gel. In another view, FIG. 15 for example, an expansion interface between air and the gel-filled cavity is depicted. The expansion interface is visible in the view of FIG. 15 but not in the view of FIG. 22. Bonding layer 2214 is provided, preferably in addition to mounting posts 2212 to secure and seal the horizontal concentrators to the base structure.

An optional insulating layer 2227 may be provided to electrically isolate the heat conducting base 2210 from a heat conducting mounting structure (shown in FIG. 15) to which the lamp is mounted. As an option in some designs, it may be desirable to further electrically isolate the mounting substrate for LEDs in one or more of the horizontal concentrators from mounting substrates of other horizontal concentrators. To accomplish this, the heat conducting base 2210 may be divided into electrically isolated portions. When this is done, it is preferable to use circuit 2215 and perhaps also insulating layer 2227 to maintain proper spacing between electrically isolated regions of heat conducting base 2210 in the finished structure. To facilitate the assembly, it is further preferable to provide temporary connecting links between regions of heat conducting base 2210 which will ultimately be isolated and to leave these links in place through a portion of the manufacturing process to maintain precise relative positioning of parts in the assembly through the manufacturing process. These links are then removed in a stage in the manufacturing process where they are no longer required.

Typically, some of the electrical connections to the LEDs are made through an electrical connection to the mounting base which may, for example, be facilitated by the use of a solder connection or of conducting epoxy to mount the LEDs to the substrate. Additional connections to the LEDs may be made through the lead bond connections. Appropriate electrical connections are made between circuit paths of the circuit 2215 and the one or more electrical conducting areas of heat conducting base 2210 which preferably provides both thermal and electrical connection to the LEDs. As illustrated, the heat conducting base 2210 and the mounting posts 2212 normally provide dual electrical and thermal conducting functions.

Figure 19:
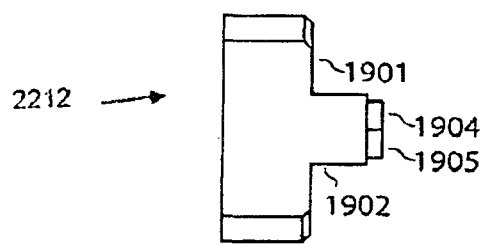
FIG. 19 depicts a top view of an LED mounting post of the illumination assembly.
Figure 20:
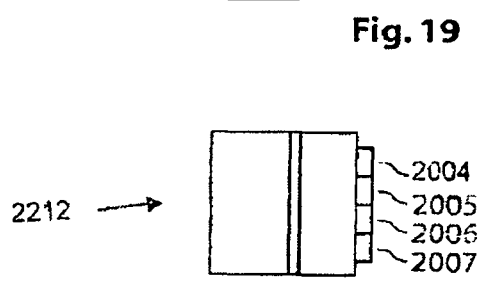
FIG. 20 depicts a side view of the LED mounting post of the illumination assembly.
Figure 21:
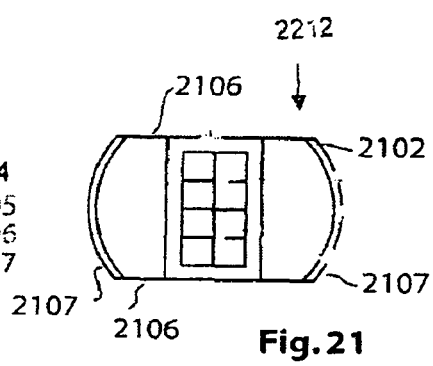
FIG. 21 depicts a front view of the LED mounting post of the illumination assembly.

FIG. 19 is a top view, FIG. 20 a side view, and FIG. 21 a front view of an LED mounting post 2212 depicted with mounted LEDs 2218. FIG. 19 illustrates a first column 1904 and a second column 1905 of LEDs 2218. Surface 1901 shown in profile serves as the backing for traces of the flexible circuit 2215 shown in fragmentary view in FIG. 17. The extended portion 1902 of the post 2212 provides the standoff distance for proper focus of the LEDs. It is preferred to use different posts and different horizontal concentrators with different standoff heights to establish the proper focal distance for LEDs of different colors. In FIG. 20, four rows 2004, 2005, 2006, and 2007 of LEDs 2218 are depicted in profile view on the face of the LED mounting post 2212. In this exemplary application, the upper two rows 2004 and 2005 are preferably illuminated for both the low and high beam modes of operation and the lower two rows 2006 and 2007 of LEDs are illuminated only for high beam operation. Either group of LEDs may optionally be replaced by a larger LED or some other number or pattern of LEDs. In the front view of FIG. 21, cylindrical portions 2107 of the mounting post 2212 are shown. These are the surfaces which are pressed into the hole 2211 provided in the heat conducting base 2210 illustrated in FIG. 22 and mate with secure mechanical, electrical, and thermal contact with the heat conducting base. Beveled edge 2102 facilitates the insertion operation in the press fit assembly process. Flat surfaces 2106 provide annular openings between the support post and the preferably round hole 2211 in the conducting base 2210 of FIG. 22 into which the LED mounting post 2212 is pressed. These annular openings are used to inject the preferably transparent, preferably flexible material which preferably has a relatively high index of refraction into the lens cavity of the associated horizontal concentrators. The openings also provide a volume into which the fill material may expand or from which it may contract to accommodate differences in expansion rates between the fill material and the containing volume. The openings may optionally be of other shapes and are convenient but do not have to be incorporated as part of the LED supporting post.

Figure 17:
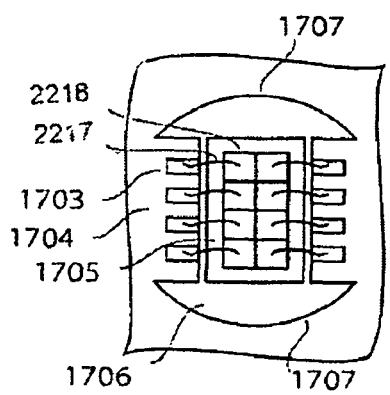
FIG. 17 is a front close-up view of a portion of the horizontal concentrator as illustrated in FIG. 16.

FIG. 17 depicts a simplified fragmentary section 1704 of the circuit 2215 which covers the heat conducting base 2210 in the region around one of the clusters of LEDs 2218. Bond wires 2217 connect to bonding pads 1703 which are preferably part of the pattern of conductors on the circuit 2215. Circuit traces not shown in the simplified drawing make appropriate connection of the LEDs to circuit components. A top 1705 of the mounting post 2212 which is shown in more detail in FIGS. 19, 20 and 21, may provide an additional electrical connection to each of the LEDs 2218, providing a conductive path to the heat conducting base 2210 described in the description of FIG. 16 below. The heat conducting base 2210, as described in FIG. 16, is preferably also electrically connected to a conductive path on the circuit 2215. Circular contours 1707 form the outer portion of the outline of two annular openings 1706 in the circuit board material of fragmentary section 1704. They are preferably sized and positioned to approximately coincide with the edges of the hole 2211 in the heat conducting base 2210 into which the LED mounting post 2212 is pressed. As described in FIGS. 19, 20 and 21, a space between the hole 2211 in the heat conductive base 2210 and flats or other channels on the LED mounting post 2212 provide open access channels to the cavity around the LEDs 2218. In the finished assembly, these cutouts in the circuit maintain an unblocked path of the channels into the lens cavities which surrounds the LEDs. The tab-like areas on the fragmentary section 1704 of the circuit 2215 which have the circuit board bonding areas for the lead bonds to the LEDs preferably extend over supporting flats on the mounting post as described in the description of FIG. 19 below.

Figure 18:
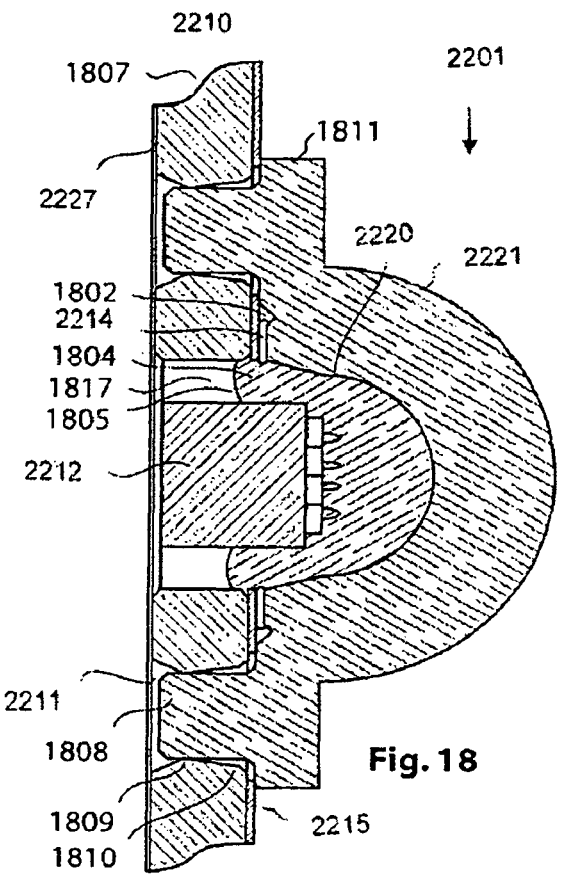
FIG. 18 depicts a close-up view of the illumination assembly of FIG. 15.

FIG. 18 is a vertical cross section view through the center of one of the horizontal concentrators (e.g., 2201) oriented in its preferred location for the exemplary automotive headlamp application. Horizontal concentrator 2201 includes refracting lens portion 2221, inner cavity profile 2220, support base area 1811 and integral mounting posts 1808 all shown in sectional view. Heat conducting base 2210 has portions of a conducting plate 1807, insulating layer 2227 and bonded circuit 2215 all of which appear in sectional view. LED mounting post 2212 with LEDs and associated lead bonds are also illustrated in FIG. 18.

In an exemplary assembly process, the finished circuit 2215 may be bonded to the heat conducting base 2210. Circuit components may be soldered or otherwise assembled to the laminated circuit board assembly. The LED support posts 2212 optionally with or without the LEDs die bonded to them may be inserted from the back into the heat conducting base 2210. Any remaining die bond and the lead bond operations may be completed. Bonding layer 2214 may be dispensed either to the back of horizontal concentrator 2201 or to the heat conducting base 2210 around the LED assemblies and the horizontal concentrator 2201 may be pressed into position. Transparent fill material 1804 may then be injected through openings 1817 and cured.

Several features of the structure enhance its ability to withstand relative movement of parts with temperature excursions due to thermal expansion differences. The bonding layer 2214 is preferably relatively flexible as is transparent fill material 1804. The interface 1805 of fill material 1804 to air in openings 1817 provides a flexible interface for expansion and contraction of the fill material 1804 during thermal excursions. Without this flexible interface, the pressure due to the expansion of the fill material 1804 might fracture the bonding layer 2214 or cause other unwanted displacements or mechanical damage. Shrinkage of the fill material 1804 in a confined chamber might lead to tears in or separation of the fill material 1804 from surfaces in the cavity, for example, separation along an optical interface such as at the inner cavity profile 2220 or from the LEDs leading to distortion and reflections in the optical path and possible damage to LED bonds. The holes 2211 in heat conducting base 2210 are preferably shaped in an hour glass like pattern as shown. The features just described are exaggerated for clarity in the view and FIG. 18. The area of greatest constriction in the hole 2211 preferably occurs toward but not at the outer end of post 1808. With this configuration, the posts 1808 may be sized for a secure press fit in an area of constriction 1809 while providing a modest clearance at the top of the hole in the area 1810. This modest clearance provides a good conically shaped constriction into which to press the posts 1808. Furthermore, small differences in spacing of the posts 1808 on horizontal concentrator 2201 relative to the spacing of holes 2211 in heat conducting base 2210 due to thermal expansion mismatches and/or initial spacing mismatches are accommodated at least in part by bending or flexing of the posts along their length instead of requiring direct deformation of the part as would be the case if the hole and post where a press fit along the full length of the post or toward the area where the post joins the heat conducting base 2210 of the lens part.

Groove area 1802 provides a small offset step so that base area 1811 may be pressed into solid contact with the face of the circuit 2215 while providing a small controlled clearance for bonding layer 2214. The groove area 1802 may optionally also provide a space for spill out of excess glue of the bonding layer 2214 around the glue joint area.

Figure 12A:
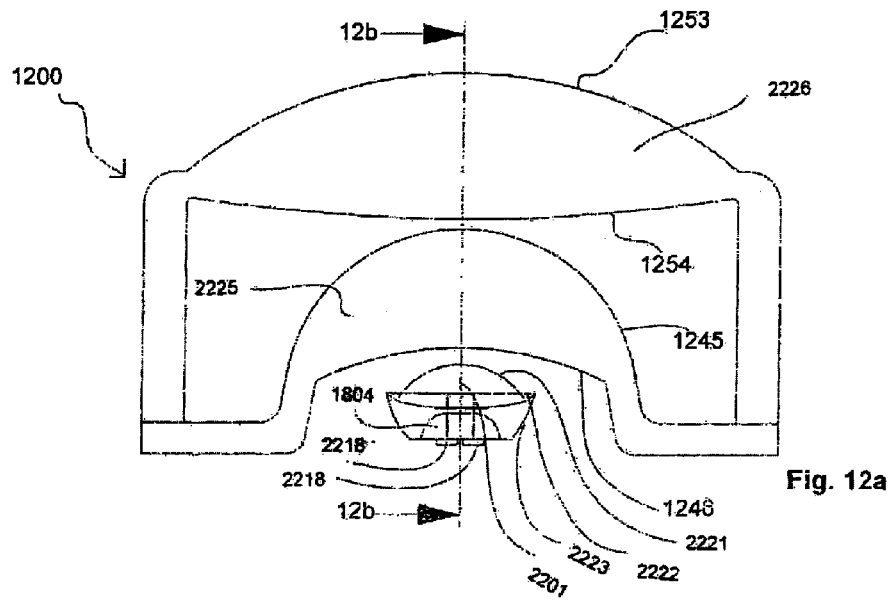
FIG. 12a is a cross-sectional view of an illumination assembly.
Figure 12B:
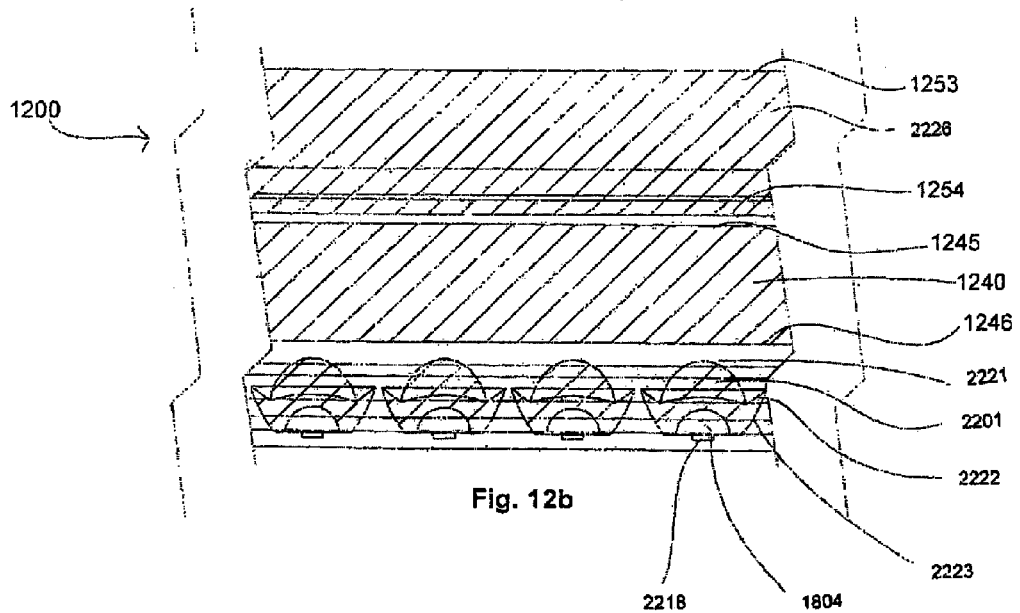
FIG. 12b is a cross-sectional view of the illumination assembly of FIG. 12a taken along the line 12b-12b.

Turning now to FIGS. 12a and 12b, there are depicted profile views of an illumination assembly 1200 comprising the horizontal concentrator 2201; the inner cylindrical lens element 2225; and the outer cylindrical lens element 2226. The cross section depicted in FIG. 12b is along the line 12b-12b of FIG. 12a. As depicted in FIG. 12a, a first light source or LED 2218 and a second light source or LED 2218 may be included to project light through individual inner lens elements which may in turn be associated with a plurality of inner lens elements to project light through a given middle lens element and/or an outer lens element. As depicted in FIG. 12b, a given inner lens element may only have a single light source associated therewith. It should be understood that more than two light sources may be associated with a given inner lens element, a given middle lens element, a given outer lens element, a combination thereof or a sub-combination thereof. In at least one embodiment an inner lens element comprises the refracting lens portion 2221 at least partially surrounded by the exit surface 2222. In at least one embodiment, the reflecting lens portion 2223 at least partially surrounds the refracting lens portion 2221 and/or the exit surface 2222. In at least one embodiment, the material 1804 having a different refractive index as compared to material of the horizontal concentrator is provided. In at least one embodiment, the inner cylindrical lens element 2225 comprises a first surface 1245 and a second surface 1246. In at least one embodiment, the outer cylindrical lens element 2226 comprises a first surface 1253 and a second surface 1254.

Figure 13A:
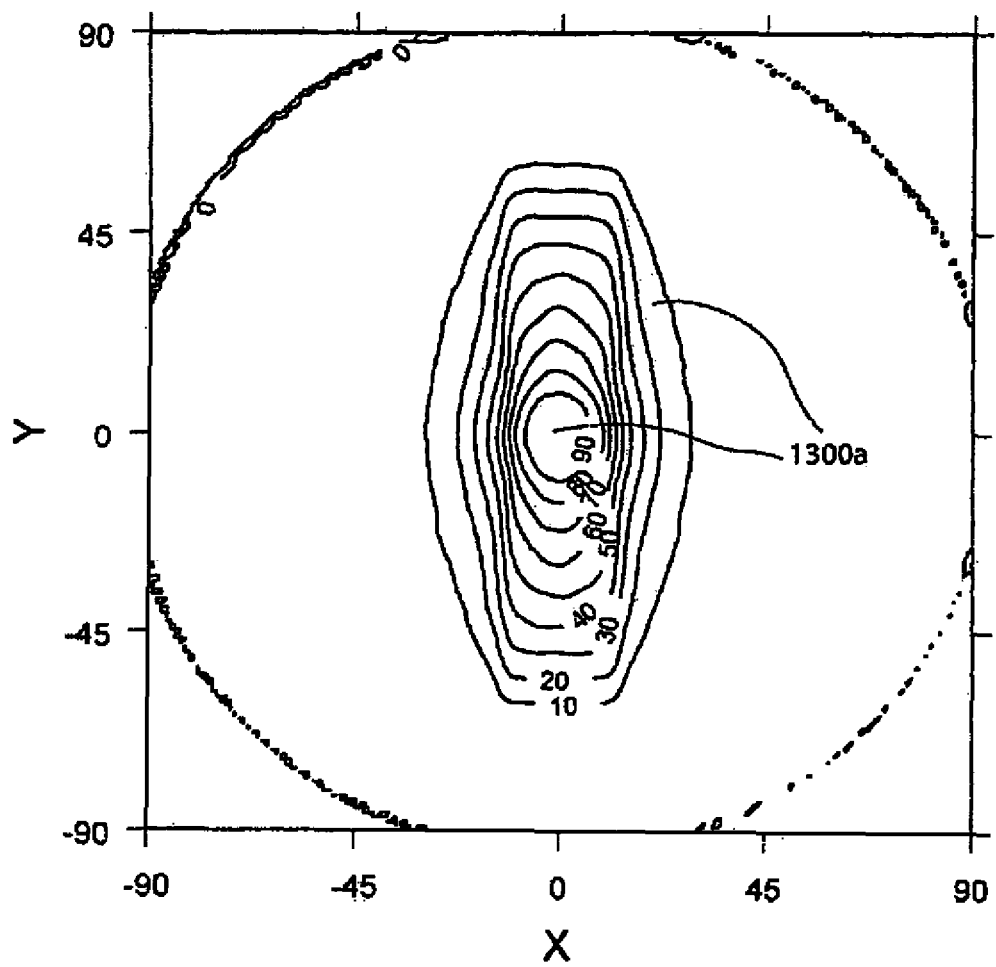
FIG. 13a illustrates an illumination pattern emitted from a horizontal concentrator similar to that depicted in FIG. 12a with two light emitting diode dies similar to that depicted in FIG. 7.
Figure 13B:
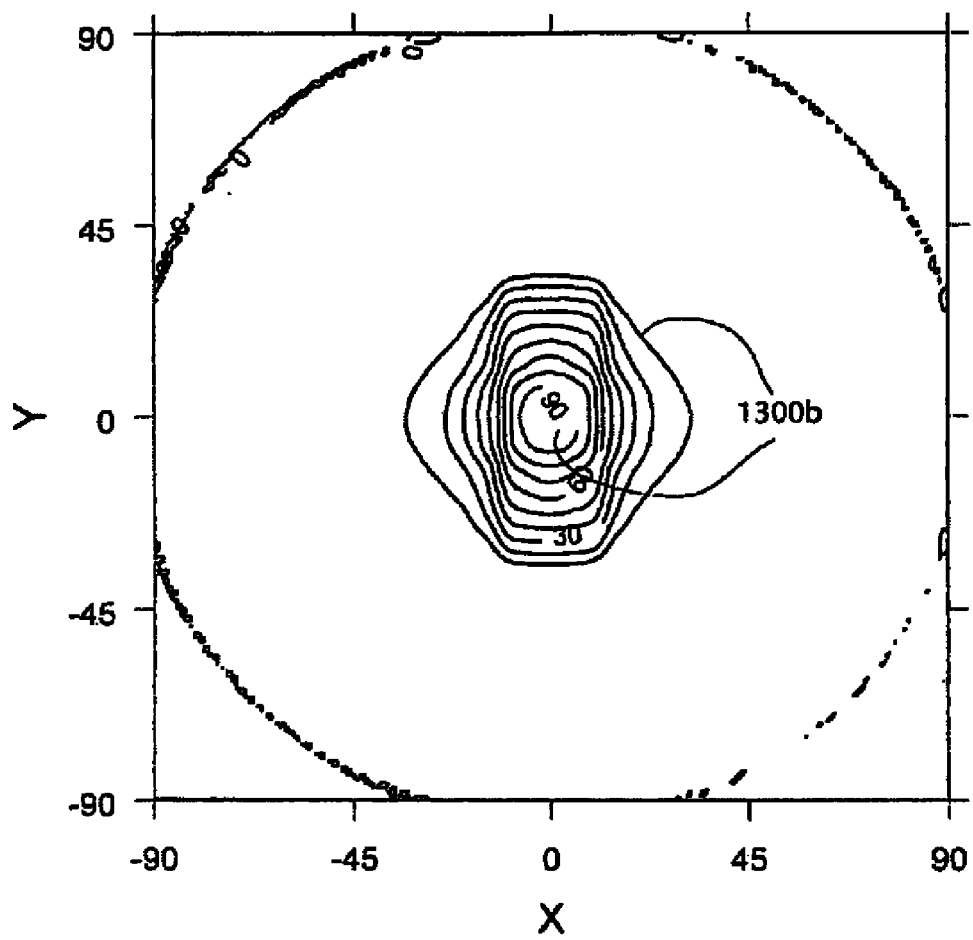
Figure 13C:
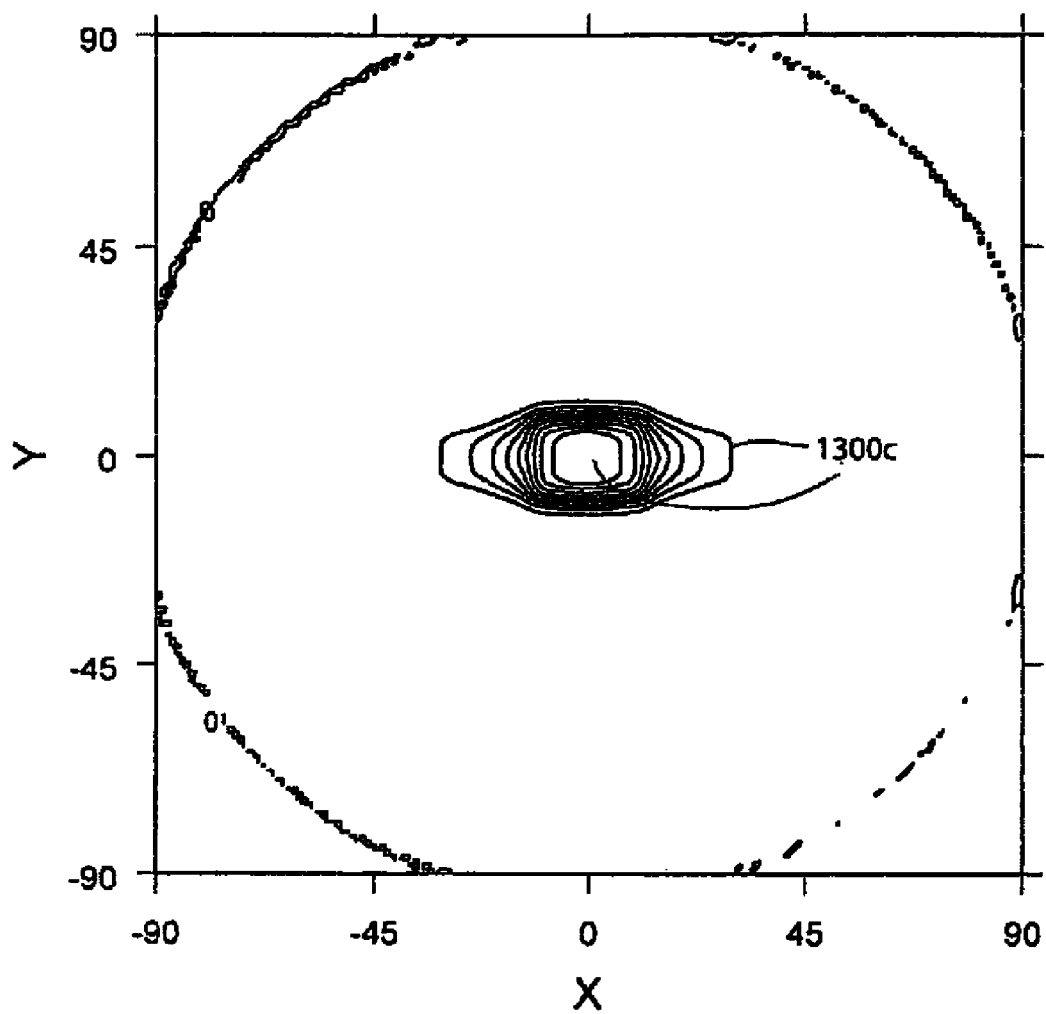
FIG. 13c illustrates the illumination pattern emitted from a lens element that has received the illumination pattern as depicted in FIG. 13b.

FIGS. 13a through 13c depict plan views of various illumination patterns with topographical type illustrations. The individual gradient lines 1300a, 1300b, 1300c represent normalized values with ten increments. FIG. 13a illustrates the illumination pattern emitted from a horizontal concentrator similar to that depicted in FIG. 12a with two light emitting diode chips similar to that depicted in FIG. 7. FIG. 13b illustrates the illumination pattern emitted from a lens element that has received the illumination pattern as depicted in FIG. 13a. FIG. 13c illustrates the illumination pattern emitted from a lens element that has received the illumination pattern as depicted in FIG. 13b. The x and y axis of FIGS. 13a-13c represent degrees of divergence with respect to a central optical axis.

Figure 14A:
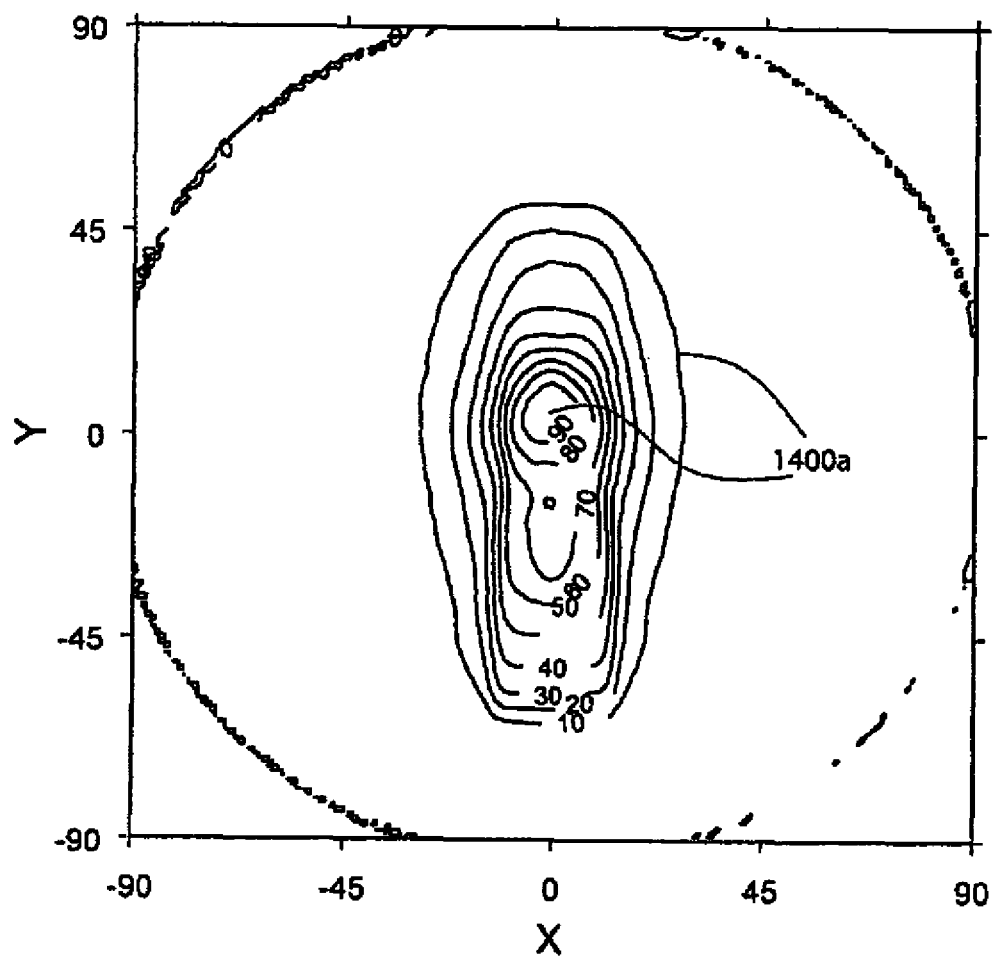
FIG. 14a illustrates the illumination pattern emitted from a horizontal concentrator similar to that depicted in FIG. 12a with two offset light emitting diode chips similar to that depicted in FIG. 9.
Figure 14B:
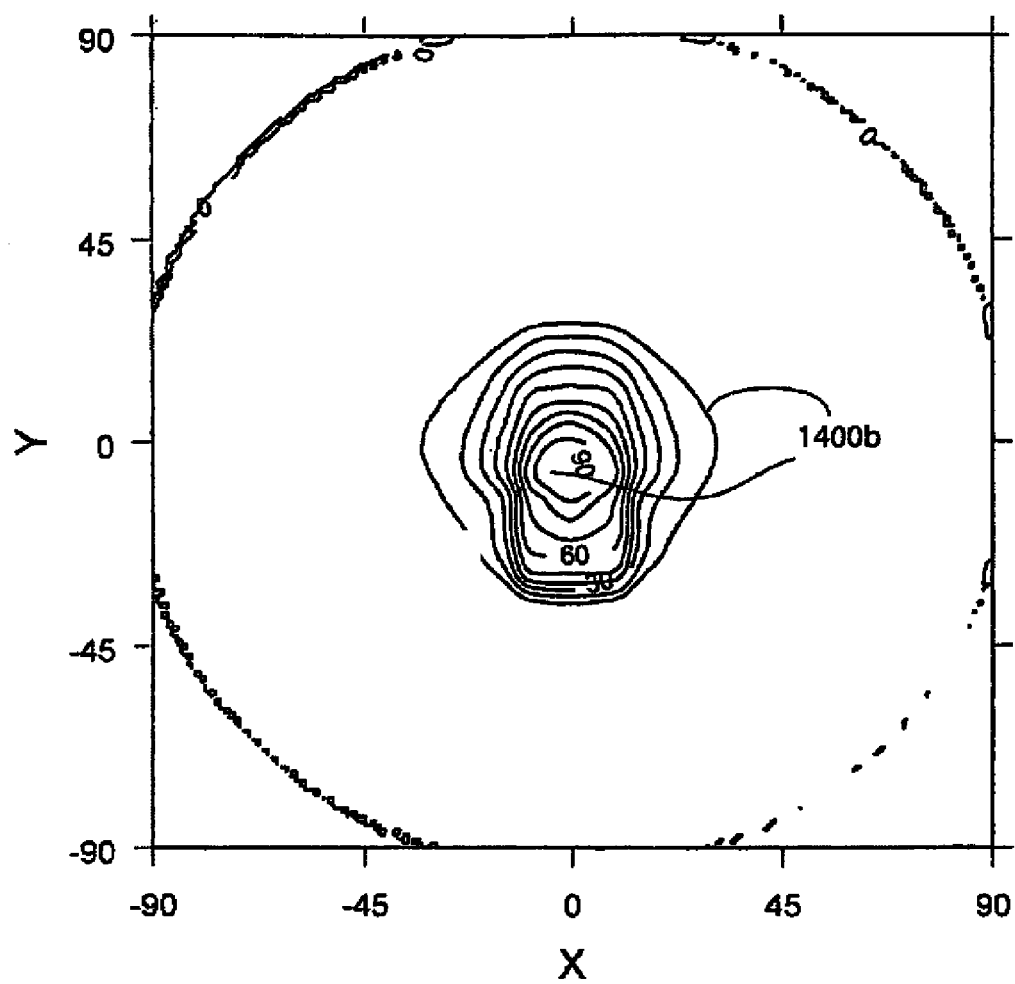
Figure 14C:
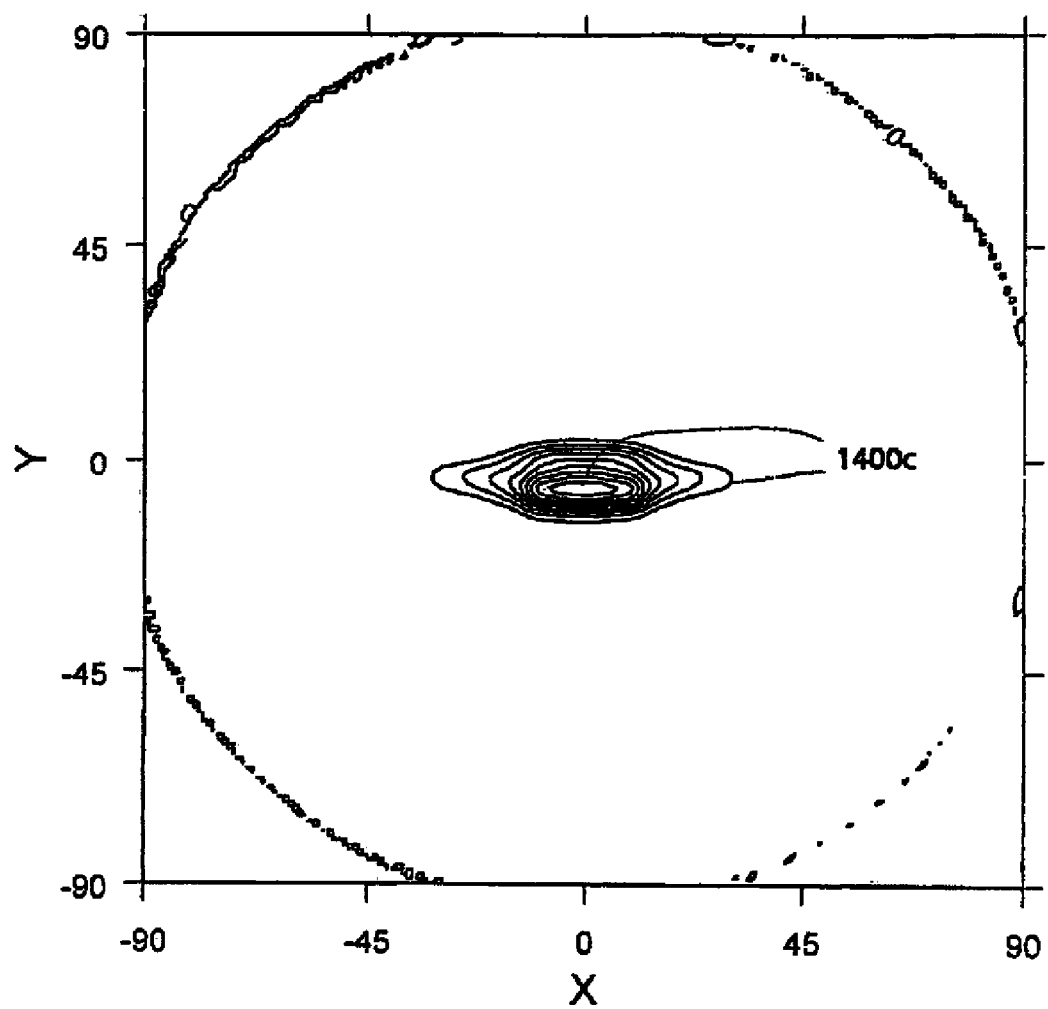
FIG. 14c illustrates the illumination pattern emitted from a lens element that has received the illumination pattern as depicted in FIG. 14b.

FIGS. 14a through 14c depict plan views of various illumination pattern topographical type illustrations. The individual gradient lines 1400a, 1400b, 1400c represent normalized values with ten increments. FIG. 14a illustrates the illumination pattern emitted from a horizontal concentrator similar to that depicted in FIG. 12a with two offset light emitting diode chips similar to that depicted in FIG. 9. FIG. 14b illustrates the illumination pattern emitted from a lens element that has received the illumination pattern as depicted in FIG. 14a. FIG. 14c illustrates the illumination pattern emitted from a lens element that has received the illumination pattern as depicted in FIG. 14b. The x and y axis of FIGS. 14a-14c represent degrees of divergence with respect to a central optical axis.

Figure 15:
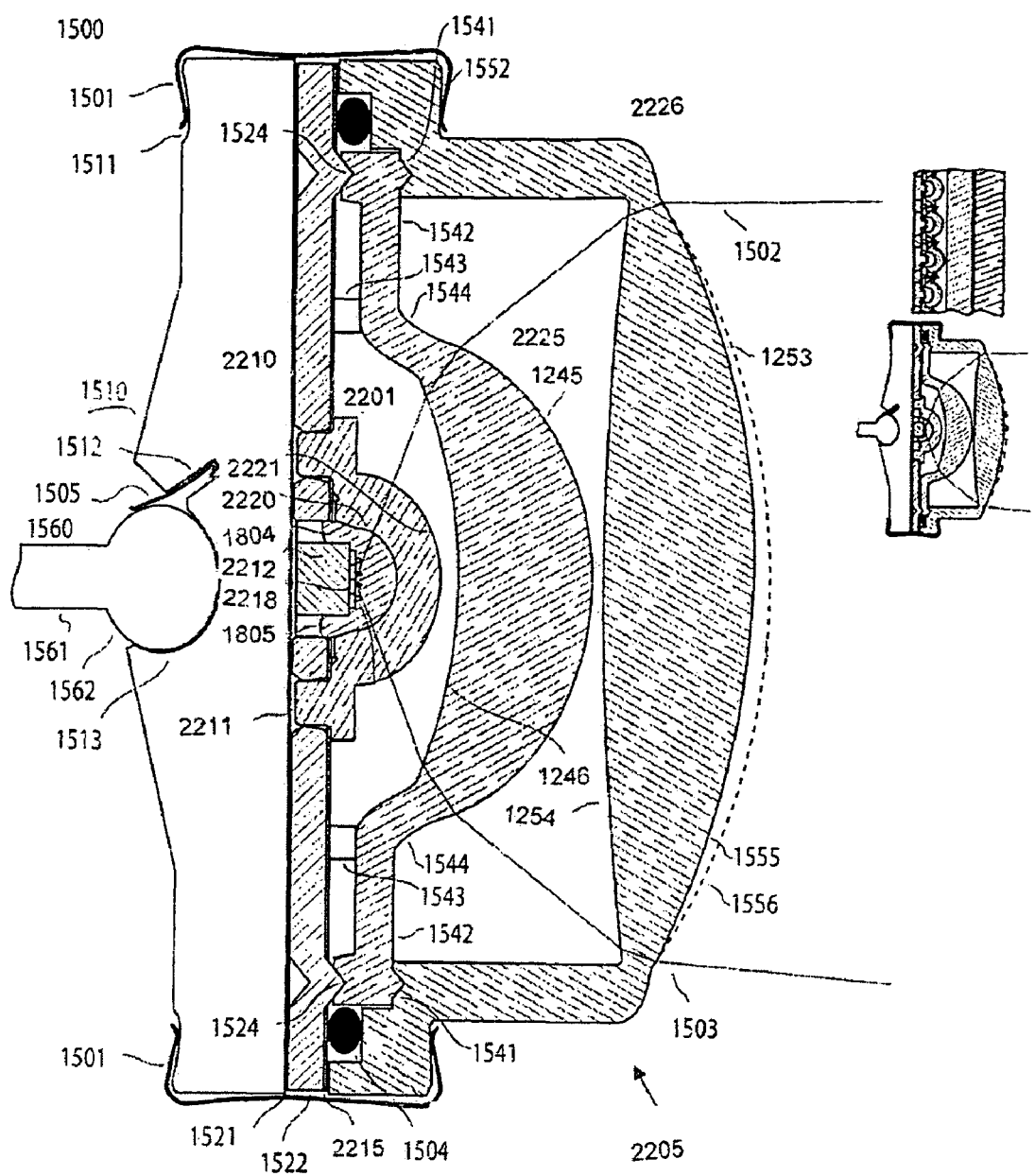
FIG. 15 is a first cross-sectional view of a headlamp assembly.

FIG. 15 is a sectioned side view of an exemplary LED headlamp assembly 1500. The assembly 1500 includes the vertical concentrator 2205 consisting of a two element cylindrical lens assembly having the outer cylindrical lens element 2226 and the inner cylindrical lens element 2225. These lenses focus light from an array of individual LED and horizontal concentrators (one of which is shown in sectioned view as 2201) which are mounted to the heat conducting base 2210. The heat conducting base 2210 is mounted to and is preferably in good thermal contact with a heat conducting mounting assembly 1510 which has an adjustable position. The mounting assembly 1510 hinges on an elongated rod-like assembly 1560 which includes a mounting member 1561 shown in partial detail which may optionally provide additional adjustment in the horizontal direction. The mounting member 1561 preferably maintains good thermal contact of the headlamp assembly to a heat sink member which may optionally be a massive portion of the frame of the vehicle and/or, for example, a finned heat sink having fins which are preferably external to any windowed enclosure in which the lamp assembly may be placed. Most of the components other than spring clips 1501, the heat conducting mounting assembly 1510 and the elongated rod like assembly 1560 are described elsewhere in some detail. Features of the heat conducting base 2210 are described in association with FIG. 16 and various features of the horizontal concentrator 2201 are described in association with FIG. 18 in particular and also in association with FIGS. 17, 19, 20, 21 and 22.

The surface 1562 is preferably cylindrical rather than spherical in shape so that a long, relatively continuous line of thermal contact may preferably be maintained preferably along nearly the full length of the LED headlamp assembly. Clearance between cylindrical surface 1562 of the elongated rod like assembly 1560 and mating cylindrical surface 1513 in heat conducting mounting assembly 1510 is preferably small to maintain good thermal contact and is preferably lubricated with a heat conducting grease. Further, a spring member 1505 preferably maintains pressure to hold the cylindrical surface 1562 in secure contact with the mating surface 1513 of the heat conducting mounting assembly 1510 to provide a low backlash pivot and good thermal conductivity across the hinged area. The spring member 1505 preferably includes a feature to securely retain it. For example, one edge may be folded over to an acute angle. This is inserted into the slot 1512 in the heat conducting mounting assembly 1510 and serves to spring against the opposing walls of the slot in order to retain the spring member in its proper position. The opposite edge of spring member 1505 is preferably formed to contact cylindrical surface 1562 smoothly to allow rotation without binding and is preferably designed to provide uniform pressure along the length of elongated rod-like assembly 1560 holding it in close contact with the cylindrical surface 1513 of the heat conducting mounting assembly 1510. This pivotal structure is preferably linked to a headlamp adjustment system which may provide manual and preferably also automatic headlamp aiming features. Heat conducting base 2210 includes mounting holes 2211 for a number of the horizontal concentrators. These horizontal contractors are described in some detail elsewhere. FIG. 15 illustrates the engagement of the V-shaped positioning surfaces 1524 with the corresponding channel in the inner cylindrical lens element 2225 and the V-shaped projection 1541 of the inner cylindrical lens element 2225 which engages a mating groove in the outer cylindrical lens element 2226. Spring clips 1501 preferably maintain pressure along substantially the full length of the lens assembly at both the top and bottom or opposing sides of the assembly. There are preferably features such as the slanted surface shown in surface 1511 of the heat conducting mounting assembly 1510 and surface 1552 of outer cylindrical lens element 2226 which the spring clip engages to prevent the spring clip from coming off. Outer cylindrical lens element 2226 preferably does not make direct contact with the heat conducting base 2210. Instead, the clamping pressure of the pair of spring clips 1501 is preferably transferred generally across the V-shaped positioning surfaces from the outer cylindrical lens element 2226 to the inner cylindrical lens element 2225, from the inner cylindrical lens element 2225 to the heat conducting base 2210, and finally from the heat conducting base 2210 to the heat conducting mounting assembly 1510. Heat conducting mounting assembly 1510 may optionally be electrically isolated from the heat conducting base 2210 by insulating layer 1521. The heat conducting mounting assembly 1510 and the heat conducting base 2210 should be fastened or otherwise key together so that they are registered in and maintain proper position one to another. The detailed structure is exemplary and other configurations are within the scope of the patent. In summary, a system of springs and mating reference surfaces serve to maintain pressure across a prescribed pattern of reference surfaces holding precise and repeatable relative placement tolerances between parts of the lens assembly where required and allowing for relative motion or slippage in directions where differences in thermal or moisture induced expansion rates would otherwise cause problems and possible malfunction of the device. The system is designed to tolerate relative motion or variance in initial positioning in the directions where inter-part slippage is facilitated and to continue to operate normally in the face of slippage or differences in initial positioning due to temperature changes, or other environmental or tolerance related reasons. The path and general containment of O-ring 1504 is described in association with FIG. 16. As indicated, a seal is maintained generally between the surface of circuit 2215 which is part of heat conducting base 2210 and a surface molded into outer cylindrical lens element 2226. The O-ring is retained in a channel which may in part be formed on the inner side by inner cylindrical lens element 2225 and on the outer side by a lip on outer cylindrical lens element 2226. This cylindrical lens assembly consisting of inner and outer cylindrical lens elements 2225 and 2226 collects light from multiple horizontal concentrators including 2201 and focuses it in a direction generally forward of the vehicle. Optionally, more than one headlamp unit may be used in a headlamp module. As explained in other parts of the patent specification, the horizontal concentrators of which 2201 is one are designed so that relatively sharp focus of the lens elements 2225 and 2226 of the vertical concentrator 2205 is relatively unhindered by the intervening toroidal lens assemblies of the horizontal concentrators. Ray 1502 illustrates the upper extent and ray 1503 the lower extent of a relatively wide collection angle of the vertical concentrator 2205.

It is preferable to shape supporting members 1542 of the inner cylindrical lens element 2225 so that the assembly springs against spacers 1543 allowing these spacers to establish the position of the inner cylindrical lens element 2225 with active lens surfaces 1245 and 1246 relative to the horizontal concentrator 2201 and the outer cylindrical lens element 2226. Then, as an option, the height of spacers 1543 may be changed modestly to adjust focus over a limited range without the need to change tooling for the lens parts which are preferably fabricated by molding.

The index of refraction of the preferred polycarbonate lens material decreases with increasing temperature making it desirable to increase the focal distance more than in proportion to the increase in lens size due thermal expansion with increasing temperature. Because of the greater thermal expansion coefficient for the plastic relative to the material of the base 1522, the distance between V-shaped positioning surfaces 1524 expands more for the inner cylindrical lens element 2225 when unrestrained than the comparable distance between V-shaped positioning surfaces 1524 for the restraining base 1522. This restraint of the inner cylindrical lens element 2225 by the heat conducting base 2210 effectively squeezes the supporting members 1542 of the lens support slightly closer together than they would otherwise be as temperature increases. This displacement is accommodated primarily by bending of angled portions 1544 of the lens support. If the angled portions 1544 of the lens support were perpendicular to supporting member 1542, this thermally induced displacement would have minimal effect on the spacing of the inner cylindrical lens element 2225 relative to the horizontal concentrator 2201, but with the obtuse angle as depicted between support member 1542 and the angled portions 1544, the inner cylindrical lens element 2225 will be pushed away from the horizontal concentrator 2201 as temperature increases. This motion is in the correct direction to at least partially compensate for the decrease in refractive index of the lens material with increasing temperature. Furthermore, the obtuse angle shown is only for illustration and increasing the obtuse angle between lens support members 1542 and lens angled portions 1544 generally within the range of 90 to 180 degrees will increase the displacement and the resulting focal distance of the lens with increasing temperature providing at least partial compensation for the change in the refractive index of the lens material with temperature.

There are a number of possible options for the optical design of the lens elements of the vertical concentrator which constitute the optical portions of inner cylindrical lens element 2225 and the outer cylindrical lens element 2226. Since the low beam pattern is the most difficult to provide, the following discussion will assume that only the LEDs normally used for the low beam pattern are illuminated. For the general proportions indicated in the example of FIG. 15, if the lenses in the inner cylindrical lens element 2225 and the outer cylindrical lens element 2226 of the vertical concentrator 2205 are designed for sharp focus, the LEDs illuminated for the low beam function project into a pattern having an elevational pattern of 5 to 6 degrees due to the size of the pattern of LEDs relative to the focal length of the lens system. The elevational angle desired for the system is somewhat more than twice that with considerable gradation in intensity desired with the highest intensity desired close to the upper edge of the brightly illuminated area of the pattern. Several goals which are in partial tension with each other and a set of viable objectives for the lens design will be presented here. Among competing goals are to collect light over a wide angle as, for example, indicated by bounding rays 1502 and 1503. Another goal is to "share the refractive load" keeping the maximum refractive angle at each of the four lens surfaces approximately equal and preferably in the neighborhood of 15 degrees, for example, for rays which are approximately in the plane of the paper for FIG. 15, i.e., approximately normal to the longitudinal axis of the lens. Another goal is to limit the thickness of each lens to improve molding properties. Another goal is to keep the overall height of the lens reasonably small. This objective translates generally into keeping the air spaces between lenses relatively small and in getting as much use out of surfaces 1246 and 1245 as is reasonable. The lenses as depicted provide approximately equal maximum refractive angles at each surface and were initially designed for relatively sharp focus with dashed surface 1556 as the front surface of the lens, with the objective to generally focus light from the optical center of the LED array into parallel rays as viewed from the end as in FIG. 15. Next, the dashed surface 1556 was modified by generally retaining the radius of curvature of the upper part of the outer cylindrical lens element 2226 in the first surface 1253 to generally maintain relatively sharp focus in the upper area of the first surface 1253 to maintain the higher intensity at the upper portion of the low beam pattern. As part of the modification, the radius of the lower portion 1555 of this outer lens face was generally increased, preferably keeping it approximately tangent to the upper portion. This increased radius has the effect of moving the focal point for this lower portion of the lens to a position back of the focal center of the LEDs serving to fan the projected light pattern in the downward direction. The modifications as indicated to this point leave the upper portion of the lens essentially unchanged from the dotted profile and progressively increase the thickness of the lens in moving downward through the lower portion 1555 roughly from the center of the lens toward the ray 1503. To minimize this extra thickness, the entire front surface was rotated clockwise by about three degrees, for example, about a point roughly where upper bounding ray 1502 intersects the front lens surface. This introduces aberrations and requires re-trimming the focus; but, the primary effect since it effectively removes a prism shaped piece of plastic is to refract the entire beam pattern upward in elevational angle by just over one degree. This overall bending may be accommodated for by overall aiming of the lamp. With cylindrical surfaces, a prescription for choice of appropriate segments of a lens surface followed by translation may lead to a similar modification. A more general description of the effect achieved is as follows. The lens system is modified in a way which reduces the thickness and/or increases the symmetry of a lens element with the side effect of creating a change in the angle of emission of the project pattern of illumination. The resulting change in the angle that the pattern of illumination is projected from the lamp assembly is then corrected at least in part by changing the aiming of the lamp structure.

FIG. 16 depicts a fragmentary portion of the base assembly for the exemplary LED headlamp assembly 1500. Four clusters of LEDs with their associated toroidal lens structures or horizontal concentrators are depicted as units 2201, 2202, 2203, and 2204. There may be many more clusters of LEDs in a total headlamp assembly. The assembly, as depicted, is generally rectangular in shape and is bounded on the outside by outline 1601. The fragmentary portion is shown extending to cut line 1628. The assembly preferably is built on a heat conductive base, for example, a strip of preferably work hardened copper which may, for example, be 1.5 mm thick. This base preferably has isolated conductive circuits formed on it or attached to it. For example, a polyimide insulated flex circuit may be bonded to the stamped and formed copper strip and provides connecting paths to the LEDs. The circuit preferably includes an external connection to receive power and control signals and perhaps to return status signals. Connection is provided by flex circuit area 1606 which may extend beyond the base preferably as an extension of the circuit material which extends over the base, may be flexible so that it may be positioned to make the connection, and preferably has contact areas depicted as 1605 and interconnecting traces not shown in this simplified drawing. The circuit may support components represented here by component 1627 and may include various interconnections, for example, a connection depicted at 1619 to the underlying copper strip. The underlying strip is preferably in electrical and thermal contact either directly serving to mount the LEDs or indirectly as illustrated serving to attach the members to which the LEDs are attached. With the preferred assembly which is depicted, it is preferable that the base assembly serve multiple functions which may include the functions just described and also may include functions to be described below. To meet the requirements for the pattern of illumination especially for the low beam as described before and to overlay patterns of differing colors precisely enough to properly blend the colors and to maintain a reasonably small structure, it is necessary to accurately position the LEDs and lenses relative to each other. It is especially important to maintain precise repeatability in the positioning pattern since the repeatability in the optical system from one group of LEDs to the next is one of the main factors which leads to proper registration of the patterns of illumination from one group of LEDs to the next.

The underlying strip preferably includes features, for example holes 1636, to position and secure the LED assemblies and holes 2211 to position and secure the individual horizontal concentrators. Holes 1609 and 1610 are like holes 2211 and 1635 and show more clearly in FIG. 16 because a horizontal concentrator and LED assembly is not placed in them. Glue is preferably also used to retain and seal the toroidal LED lens assemblies to the base structure. The preferred structure includes raised projections 1629-1634. These raised projections preferably have pairs of precisely formed preferably V-shaped positioning surfaces 1524 to properly register and position the cylindrical lens assembly relative to the LEDs and their associated toroidal lenses. For example, in the preferred structure the formed, raised portions 1629 through 1634 provide a pair of rows of aligned V-shaped reference surfaces. One is close to the upper and one is close to the lower edge of the base structure. These rows of reference surfaces register with corresponding V-shaped grooves in the inner cylindrical lens element. When positioned on the base, the inner cylindrical lens element assumes the position indicated by the outline shape 1604 which depicts the nominal edge of the inner cylindrical lens element. The outer cylindrical lens element is then referenced by a similar V engagement to mating V-shaped projections in the inner cylindrical lens element with V-shaped grooves in the outer cylindrical lens element. It is preferable to provide some extra clearance in the outer cylindrical lens element close to its ends to allow for the differential expansion of the end of the outer cylindrical lens element relative to the base structure. Except for these portions of the structure, slight flexing of the lens structures can take place to accommodate the difference in expansion rates between the lens material and the base material as it affects the spacing of the rows of reference surfaces and the mating grooves and the lens structure. When the structure is relatively long, there may be considerable differential movement between the base and the cylindrical lens assembly in the direction parallel to the rows of positioning projections. This is the reason that the groove structure is preferred, since the structure may readily slide along these grooves to accommodate differences in thermal expansion rates while maintaining the required alignment and focus distance in the directions which are generally perpendicular to the grooves. The choice of a lens type (cylindrical, for example) for the vertical concentrator with optical properties which are tolerant to displacement along the axial direction and the mechanical design to permit movement due to expansion differences of the vertical lens structure relative to the lens structures of the horizontal concentrators with their associated LEDs are features of the invention which solve a difficult problem in accommodating differential thermal expansion. The end blocks of which the one 1608 is shown are preferably used to retain an O-ring seal as it goes around the end of the structure and also to directly or indirectly register the positions of the intermediate and outer lens assemblies. The end blocks are preferably positioned to allow clearance for differential expansion over the required temperature range while maintaining proper positioning of the cylindrical lens assemblies relative to the base assembly in the direction of the positioning grooves. The segmented array of locating projections in the base structure is preferred to a continuous formed groove so that the circuit material may extend around the segmented projections and, among other things, provide a smooth sealing surface to act as a portion of the seal with the lens cover assembly. This structure also allows the circuit material to pass under the seal and thereby form a continuous section with the flex circuit area 1606 as depicted. The requirements for precision make it preferable to use a progressive die in forming the positioning projections and holes for the LED and lens structures. It is preferable to fabricate a metal strip which is part of the base assembly as a continuous strip. This is why the projections 1629 and 1630 and the associated sets of holes for example 1609 and 1610 are provided and perhaps not fully utilized. The segmented pattern of projections in addition to providing space for the circuit to surround the projections has also provided space for flat contact to the seal at the ends of the structure. Thus, it is a desirable feature of the structure to provide for utilization of a continuously formed and/or punched substrate section where the features which are provided at uninterrupted uniform intervals along the strip are accommodated by the design whether or not they are fully used. This also saves tooling when different lamp modules use different numbers of horizontal concentrators in a strip.

Contours 1602 and 1603 and outline shape 1604 do not necessarily represent visible features in the base structure. Instead, they are included to indicate regions of interest in the structure. Outline shape 1604 is nominally at the edge of the intermediate lens assembly and the region between contours 1602 and 1603 is the area which should preferably be kept flat and smooth to serve as a surface to form a seal with the O-ring which is captured by a gland in the cover portion of the outer cylindrical lens assembly. The end block 1608 and the outline shape 1604 of the intermediate lens assembly may serve to retain the O-ring in a space between the base and the outer lens assembly.

Figure 23:
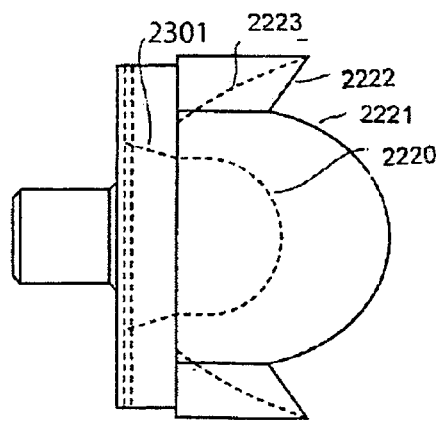
FIG. 23 depicts a top view of a horizontal concentrator of the illumination assembly.
Figure 24:
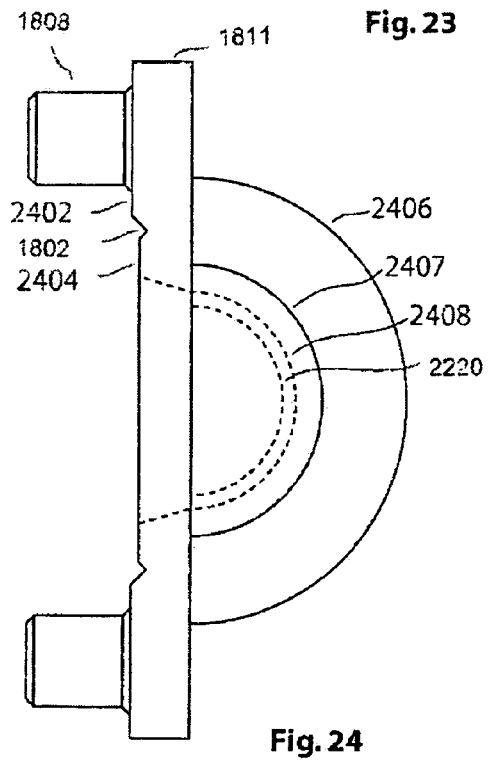
FIG. 24 depicts a side view of the horizontal concentrator of the illumination assembly.
Figure 25:
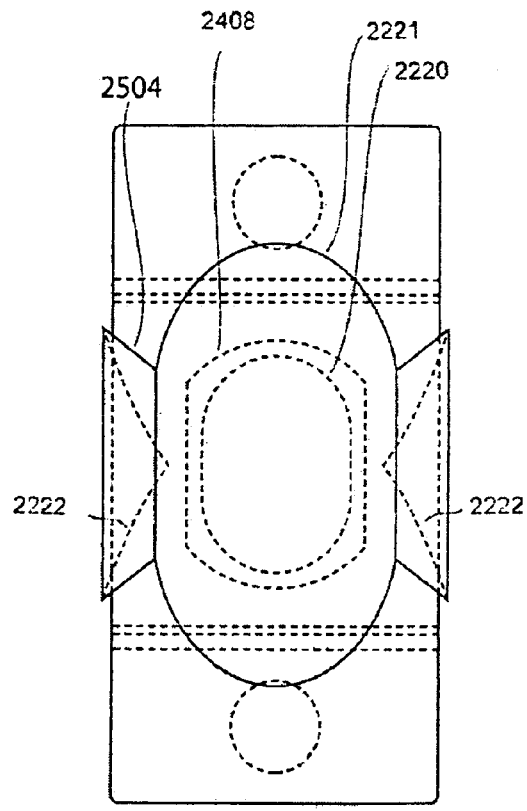
FIG. 25 depicts a front view of the horizontal concentrator of the illumination assembly.
Figure 26:
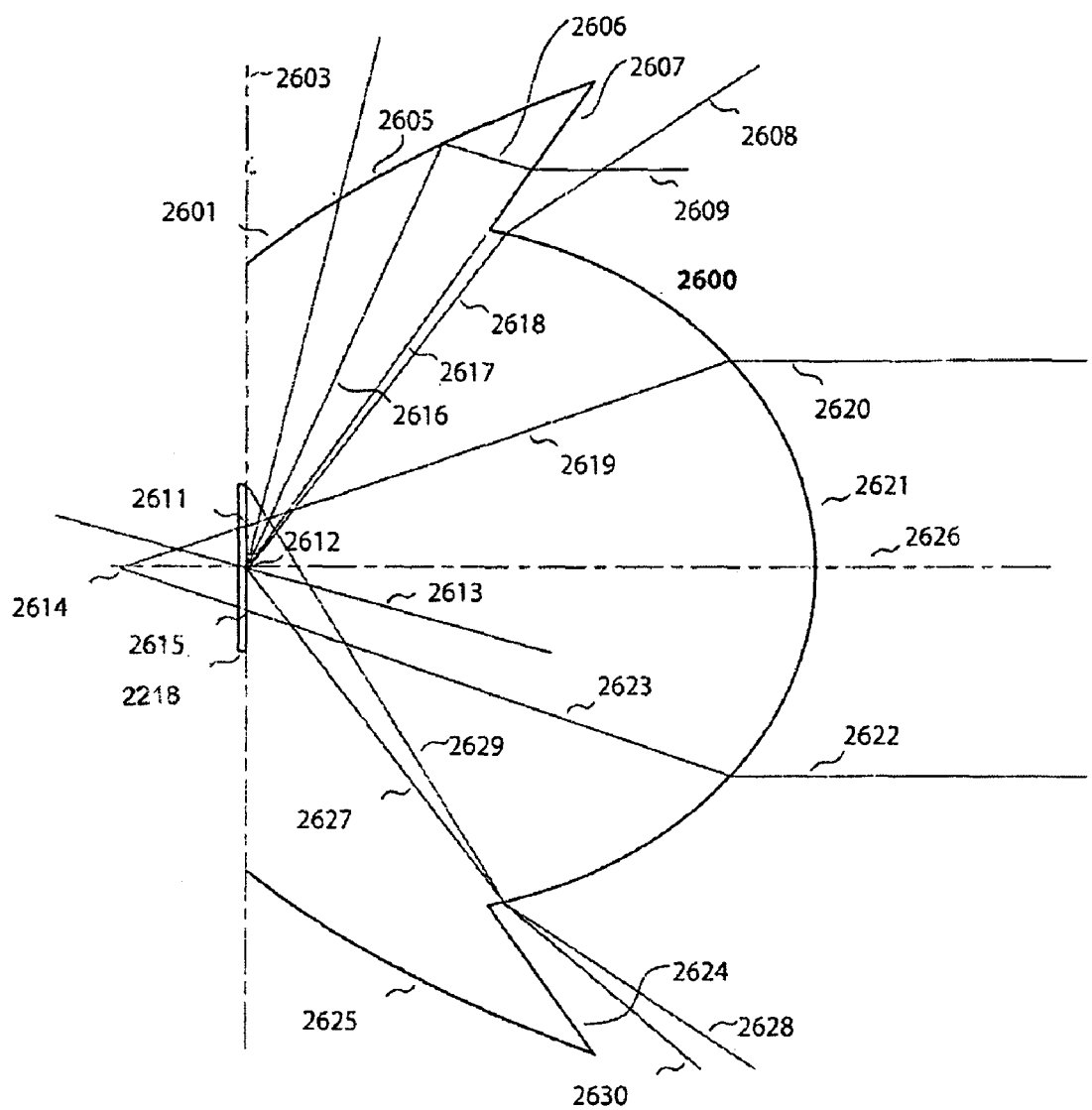
FIG. 26 depicts a partial top view of the horizontal concentrator of the illumination assembly.

FIG. 23 is a top view, FIG. 24 a side view, and FIG. 25 a front view of the toroidal lens of the exemplary horizontal concentrator. The part is preferably a one-piece part preferably molded of a material such as transparent polycarbonate. One of these lens assemblies is preferably used for each cluster of LEDs in the lighting unit. There are preferably several versions of this unit having different distances from the surface of a support base area which engages the mounting surface to the optical center of the lens to properly align the axes of the surface of revolution of the lens with the standoff height of the LEDs and the focal length of the cylindrical lens assembly of the vertical concentrator for each of the various colors used in the lamp assembly. In FIG. 23, parabolic curve section of reflecting lens portion 2223, exit surface 2222 and refracting lens portion 2221 correspond, respectively, to lines or curves 2605, 2607, and 2621 of the profile 2600 of FIG. 26. The profile 2600 of FIG. 26 is preferably used as the profile to generate the surface of revolution of the horizontal concentrator depicted in FIGS. 23 through 25. Inner cavity profile 2220 is the outline of the portion of the lens cavity used to contain the LED and lead bond wire assembly and is also preferably part of the overall surface of revolution. Portion 2301 of the overall curve is the outline of the portion of the cavity where the surface of revolution is blended into the base opening.

In FIG. 24, semicircular curve 2406 is the outline of the tip of refractive lens portion 2221 generated by rotation of reflecting lens portion 2221; semicircular curve 2220 is traced by the intersection of curve exit surface 2222 and reflecting lens portion 2221 in the surface of revolution; and curve 2407 is traced by the intersection of reflecting lens portion 2223 and exit surface 2222 in the surface of revolution. The semicircular portion of curve 2408 is the outline of the toroidal portion of the inner cavity generated by rotation of inner cavity profile 2220. Base area 1811 supports integral mounting posts 1808 and has surface 2402 shown in profile view which positions the lens against the surface of the circuit board when posts 1808 are pressed into the base of the assembly shown in FIG. 16. The groove area 1802 shown in profile view is a transition to surface 2404 also shown in profile view which serves to glue the lens assembly to the base assembly of FIG. 16. The groove area 1802 optionally includes space for excess glue to spill out during the gluing process.

In FIG. 25, the refractive lens portion 2221 is shown, the window area for the reflective lens portion 2223 of the lens is outlined by 2504 and the exit surface 2222 of the reflective lens portion 2223 is shown. The toroidal portion of the inner cavity is outlined by inner cavity profile 2220 and the opening into this cavity at the base of the lens assembly is outlined by curve 2408.

A profile 2600 is composed of curve 2605 to generate a reflective surface, curve 2607 to generate an exit window for the rays reflected from the surface generated by 2605, curve 2621 to generate a refracting lens surface, profile segment 2624 to generate an exit window for rays reflected from the surface generated by profile segment 2625, and profile segment 2625 to generate a second reflecting surface. This composite profile 2600 is rotated about centerline 2603 to generate the lens surface. LED or LED cluster 2218 is preferably situated so that centerline 2603 passes approximately through the portion of the LED chosen to project into the primary area in the projected field of illumination. This is an exemplary design and many modifications to this design are within the scope of this patent.

The curve 2621 to generate the refractive surface is elliptical and has its focal point at 2614. Representative ray 2619 emanating from focal point 2614 is refracted at curve 2621 emerging as ray 2620 which is approximately parallel to centerline 2626 of the lens structure. Similarly, symmetrically placed ray 2623 is refracted emerging as ray 2622 which is also parallel to the centerline 2626. Rays 2619 and 2623 may be considered boundaries of a cone of focus which intersects light emitting diode 2218 in an area extending from 2611 to 2615. In the example, the LED or LED array 2218 has been placed well short of focus between the focal point 2614 and the corresponding lens surface which is generated by curve 2621. This is to illustrate that even though the LED 2218 is placed well short of focus, the intensity of the central beam parallel to centerline 2626 may still be relatively strong, perhaps nearly as strong as if the centerline 2603 and an LED were placed closer to the focal point 2614. With the substantial defocus, rays 2618 and 2627 which are close to the outer extent of lens curve 2621 are projected, respectively, into rays 2608 and 2628 which diverge substantially from the direction of the centerline 2626. Ray 2629 which emanates from the most distant edge of LED 2218 is refracted as ray 2630 which diverges even farther from centerline 2626. In the headlamp application, the action of the curve 2621 to bend rays generally toward centerline 2626 while allowing the rays to fan or diverge over a substantial range is generally what is required for the relatively wide horizontal pattern of illumination for the automotive headlamp.

Added desirable features for the lens are to capture more divergent rays such as ray 2616 and to direct them into a useful portion of the pattern of illumination of the headlamp. It is desirable to project these divergent rays in a direction which is very nearly parallel to centerline 2626 in order to increase the intensity of the center area for the pattern of illumination projected by the headlamp. The curve 2605 has center axis 2613 and is preferably parabolic with focal point 2612 nominally at the center of LED 2218. Ray 2616 emanating from focal point 2612 is reflected as ray 2606 which is parallel to the center axis 2613 of the parabolic curve 2605. Ray 2606 is refracted as it passes through curve 2607 and emanates as ray 2609. As part of the design, the direction of the center axis 2613 of parabolic curve 2605 is selected to compensate for the refractive angle at curve 2607 so that ray 2619 emanates in a direction which is nearly parallel to center line 2626. Rays from the LED which strike a parabolic surface generated by curve 2605 in the region of area 2601 may strike a surface generated by curve 2621 rather than passing through the intended window generated by curve 2607. The number of rays reflecting from the surface generated by curve 2605 which do not pass through the window generated by curve 2607 may be reduced by increasing the focal length of parabolic curve 2605 maintaining its center at focal point 2612 and its central axis 2613. This has the effect to move curve 2605 generally upward as depicted in FIG. 26 and to increase the length of curve 2607. This also increases the width of the lens reducing the number of horizontal concentrator selections which will fit into a given length of lens structure. Depending on the pattern of emission of light from LED 2218, relatively few light rays may strike area 2601 in which case it may be preferable to use the smaller size as depicted rather than to employ a parabolic curve having a larger focal length which allows rays striking it over a larger part of the generated surface to exit through the intended window generated by curve 2607. These are the general considerations to balance against one another in the choice of the focal length for parabolic curve 2605. Another option is whether to coat the reflecting surface generated by parabolic curve 2605 with a reflecting layer or to use it in a totally internal reflecting (TIR) mode. For rays emanating from LED 2218 which impinge on curve 2605 generally close to area 2601, the angle of incidence may be too shallow for total internal reflection to take place. It is optional and a matter of cost, efficiency, and performance trade-offs as to whether the surface generated by curve 2605 should be used uncoated in a totally internal reflection mode or whether it should be coated with a reflective surface. Profile segment 2625 is preferably placed symmetrically to curve 2605 and the same general description given for curve 2605 also applies to the surface generated by profile segment 2625 and its associated exit window area generated by profile segment 2624.

FIG. 19 is a top view, FIG. 20 a side view, and FIG. 21 a front view of the preferred LED mounting post 2212 depicted with an array of eight LEDs 2218 mounted. In the top view of FIG. 19, two columns 1904 and 1905 of LEDs are depicted. Surface 1901 shown in profile view provides a backing for bonding areas on the flexible circuit 2215 shown in fragmentary view in FIG. 17. The extended portion 1902 of the post 2212 provides the proper mounting height from the base assembly for the LEDs. In the preferred structure, mounting posts of different heights are used for LEDs of different colors in order to establish the correct focal distance for the LEDs of each color. In the side view of FIG. 20, four rows 2004, 2005, 2006 and 2007 of mounted LEDs are shown. In the preferred application, the upper two rows of LEDs 2004 and 2005 are preferably illuminated for both low and high beam operation and the lower two rows of LEDs 2006 and 2007 are preferably illuminated for high beam operation only. In the front view of FIG. 21, cylindrical portion 2107 showing in profile view at the base of the LED post assembly is pressed into a mating hole in the conducting base assembly of FIG. 16. A beveled edge 2102 facilitates the press fit operation. Flat surfaces 2106 shown in profile view provide a pair of annular openings between the hole into which the post is pressed and the mounting post. These facilitate filling of the cavity around the LEDs and provide an opening to accommodate expansion differences between the volume of the cavity and the fill material.

It should be understood that the above description taken in combination with the accompanying figures is not intended to limit the scope of the invention in any regard. The appended claims shall be construed to include all equivalent structures and functions within the scope.

What is claimed is:

1. An optical system for projecting light from at least one light source into a pattern which is generally wider in a first direction than in a second direction, comprising:
   at least one localized light source;
   at least one first lens element operative to substantially concentrate light from said at least one localized light source in the first direction; and
   at least one second lens element to receive light from said at least one first lens element and operative to substantially concentrate the light in the second direction, wherein said at least one first lens element comprises a toroidal lens surface which is at least partially defined by revolving a curve which contains a portion which is approximately elliptical about an axis of rotation.

2. An optical system as in claim 1 wherein said at least one localized light source comprises at least one light emitting diode chip.

3. An optical system as in claim 1 wherein said at least one first lens element incorporates an at least partially toroidal portion configured to concentrate light in said first direction.

4. An optical system as in claim 3 wherein said toroidal lens surface of said at least one first lens element is configured so that relatively detailed features of the geometry of said at least one localized light source are projected into the illumination pattern by said at least one second lens element.

5. An optical system as in claim 1 wherein said at least one localized light source is positioned close to the axis of rotation of said toroidal portion of said at least one first lens element.

6. An optical system as in claim 1 wherein said at least one second lens element comprises a substantially cylindrical surface which is at least partially defined by translating a curve in a generally straight-line path.

7. An optical system as in claim 6 wherein a line of focus for the at least one second lens element is substantially coincident with the axis of rotation of said toroidal lens surface of said at least one first lens element.

8. An optical system as in claim 1 wherein said at least one first lens element defines at least a portion of a toroidal shape and said at least one second lens element defines at least a portion of a cylindrical shape.

9. An optical system as in claim 1 wherein an optical center of said at least one second lens element is substantially coincident with the at least one localized light source.

* * * * *